(12) United States Patent
Reid et al.

(10) Patent No.: US 8,190,807 B2
(45) Date of Patent: May 29, 2012

(54) MAPPING A COMPUTER PROGRAM TO AN ASYMMETRIC MULTIPROCESSING APPARATUS

(75) Inventors: Alastair David Reid, Fulbourn (GB); Edmund Grimley-Evans, Cambridge (GB); Simon Andrew Ford, Cambridge (GB)

(73) Assignee: ARM Limited, Cambridge (GB)

( * ) Notice: Subject to any disclaimer, the term of this patent is extended or adjusted under 35 U.S.C. 154(b) by 1203 days.

(21) Appl. No.: 11/976,315

(22) Filed: Oct. 23, 2007

(65) Prior Publication Data

US 2008/0114937 A1    May 15, 2008

Related U.S. Application Data

(60) Provisional application No. 60/853,756, filed on Oct. 24, 2006.

(51) Int. Cl.
*G06F 12/08* (2006.01)
*G06F 9/45* (2006.01)

(52) U.S. Cl. ............................................. 711/3; 717/136
(58) Field of Classification Search ........................ None
See application file for complete search history.

(56) References Cited

U.S. PATENT DOCUMENTS

2006/0004967 A1*  1/2006  Mithal et al.
2006/0117274 A1   6/2006  Tseng et al.
2007/0088915 A1*  4/2007  Archambault et al.
2007/0174828 A1*  7/2007  O'Brien et al.
2008/0215768 A1*  9/2008  Reid et al.
2009/0031268 A1*  1/2009  Miranda et al.

OTHER PUBLICATIONS

A.E. Eichenberger et al, "Optimizing Compiler for a Cell Processor" IEEE, 2005.
J.S. Foster et al, "Flow-Sensitive Type Qualifiers" *PLDI'02*, Jun. 2002, pp. 1-12.
R.W. Numrich et al, "Co-Array Fortran for Parallel Programming" Rutherford Appleton Laboratory, RAL-TR-1998-060, Aug. 1998, pp. 1-31.
U.S. Appl. No. 11/976,314, filed Oct. 23, 2007, Reid et al.
Office Action mailed May 4, 2011 in co-pending U.S. Appl. No. 11/976,314.
Office Action mailed Nov. 1, 2011 in co-pending U.S. Appl. No. 11/976,314.

* cited by examiner

*Primary Examiner* — Philip Wang
(74) *Attorney, Agent, or Firm* — Nixon & Vanderhye, P.C.

(57) ABSTRACT

A computer implemented tool is provided for assisting in the mapping of a computer program to an asymmetric multiprocessing apparatus 2 incorporating an asymmetric memory hierarchy formed of a plurality of memories 12, 14. An at least partial architectural description 22, 40 is provided as an input variable to the tool and used to infer missing annotations within a source computer program 24, such as which functions are to be executed by which execution mechanisms 4, 6, 8 and which variables are to be stored within which memories 12, 14. The tool also adds mapping support commands, such as cache flush commands, cache invalidate commands, DMA move commands and the like as necessary to support the mapping of the computer program to the asymmetric multiprocessing apparatus 2.

21 Claims, 20 Drawing Sheets

```xml
<?xml version="1.0" encoding="utf-8"?>
<spirit:design>
   <spirit:componentInstances>
      <!--processing elements-->
      <spirit:componentInstance>
         <spirit:componentRef spirit:name="P1"/>
      </spirit:componentInstance>
      <spirit:componentInstance>
         <spirit:componentRef spirit:name="P2"/>
      </spirit:componentInstance>
      <spirit:componentInstance>
         <spirit:componentRef spirit:name="P3"/>
      </spirit:componentInstance>
      <spirit:componentInstance>
         <spirit:componentRef spirit:name="DMA"/>
      </spirit:componentInstance>
      <spirit:componentInstance>
      <!--memory elements-->
      <spirit:componentInstance>
         <spirit:componentRef spirit:name="CACHE"/>
      </spirit:componentInstance>
      <spirit:componentInstance>
         <spirit:componentRef spirit:name="M1"/>
      </spirit:componentInstance>
      <spirit:componentInstance>
         <spirit:componentRef spirit:name="M2"/>
      </spirit:componentInstance>
   </spirit:componentInstances>
<spirit:interconnections>
      <spirit:interconnection   spirit:component1Ref="P1"
                                spirit:busInterface1Ref="master1"
                                spirit:component2Ref="CACHE"
                                spirit:busInterface2Ref="slave1" />
      <spirit:interconnection   spirit:component1Ref="CACHE"
                                spirit:busInterface1Ref="master1"
                                spirit:component2Ref="M1"
                                spirit:busInterface2Ref="slave1" />
      <spirit:interconnection   spirit:component1Ref="P2"
                                spirit:busInterface1Ref="master1"
                                spirit:component2Ref="M2"
                                spirit:busInterface2Ref="slave1" />
      <spirit:interconnection   spirit:component1Ref="P3"
                                spirit:busInterface1Ref="master1"
                                spirit:component2Ref="M2"
                                spirit:busInterface2Ref="slave3" />
      <spirit:interconnection   spirit:component1Ref="DMA"
                                spirit:busInterface1Ref="master1"
                                spirit:component2Ref="M1"
                                spirit:busInterface2Ref="slave2" />
      <spirit:interconnection   spirit:component1Ref="DMA"
                                spirit:busInterface1Ref="master2"
                                spirit:component2Ref="M2"
                                spirit:busInterface2Ref="slave2" />
   </spirit:interonnections>
</spirit:design>
```

Architectural Description

FIG. 3

```
for(i=0;i<n;i++){
   int x[100] @ M1;
   int y[100];
   foo(x);
   copy(y, x);
   bar(y) @ P2;
}
```
36

Exact
Inference

=>infer using arch desc (infer, y on M2, foo() on P1, copy with DMA)

```
for(i=0;i<n;i++){
   int x[100] @ M1;
   int y[100] @ M2;

foo(x) @ P1;
   copy(y, x) @ DMA;
   bar(y) @ P2;
}
```

=>added mapping using knowledge of arch description (dma, cache flush)

```
for(i=0;i<n;i++){
   int x[100] @ M1;
   int y[100] @ M2;

foo(x) @ P1;
   CACHE_FLUSH(x, P1);
   DMA_MOVE(y, x, 100);
   bar(y) @ P2;
}
```

FIG. 5

```
for(i=0;i<n;i++){
  int x[100] @ M1;
  int y[100] @ M2;
  foo(x);
  copy(y, x);
  bar(y);
}
```

38

Non-exact Inference

In this case, bar could execute naturally on P2 or P3. Heuristics could choose this, or a warning could be given to the programmer. The mapping could also be explicit.

```
for(i=0;i<n;i++){
  int x[100] @ M1;
  int y[100] @ M2;
  foo(x);
  copy(y, x);
  bar(y) @ oneof {P2, P3};
}
```

FIG. 6

```
for(i=0;i<n;i++) {
   int x { copy1, copy2 };
   foo(x @ copy1);
   SYNC(x);
   bar(x @ copy2);
}

=>perform dataflow, variable splitting for(i=0;i<n;i++) {
   int x_copy1;
   int x_copy2;
   foo(x_copy1);
   COPY(x_copy2, x_copy1);
   bar(x_copy2);
}
```

FIG. 9

Using inference to give full mapping

```
for(i=0;i<n;i++) {                                    76
  int x;
  foo(x);
  bar(x);
} for(i=0;i<n;i++) {
  int x {copy1=> M1, copy2=> M2 };
  foo(x @ copy1) @ P1;                                78
  SYNC(x) @ DMA);
  bar(x @ copy2) @ P2;
} for(i=0;i<n;i++) {
  int x_copy1 @ M1;                                   80
  int x_copy2 @ M2;
  foo(x_copy1) @ P1;
  COPY(x_copy2, x_copy1) @ DMA;
  bar(x_copy2) @ P2;
}
```

FIG. 10

→ control flow
⇢ data flow

```
void main(){
    int i;
    for(i=0; i<10; ++i){
        int x[100] @ {copies=2, replicatable=false; boundary=true};
        produce(x) @ {replicatable=false, writes_to=[x]};
        consume(x) @ {replicatable=false, reads_from=[x]};
    }
}
```

FIG. 16a

```
void main(){
    int x[100] @ {copies=2};
    channel c @ {buffers=x};
    parallel sections{
        section{
        int i;
            for(i=0; i<10; ++i){
            int x1[100];
            produce(x1);
            put(c,x1);
            }
        }
        section{
            int i;
            for(i=0; i<10; ++i){
            int x2[100];
            get(c,x2);
            consume(x2);
            }
        }
}
```

FIG. 16b

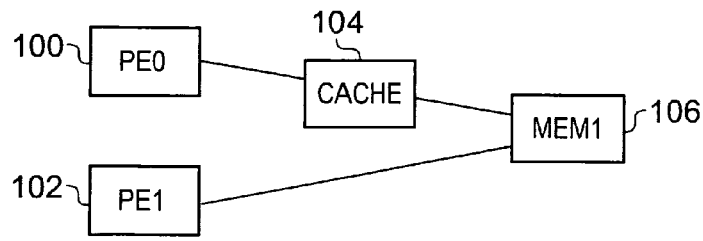

FIG. 17

```
<?xml version="1.0" encoding="utf-8"?>
<spirit:design>
  <spirit:componentInstances>
    <spirit:componentInstance>
      <spirit:componentRef spirit:name="PE0"/>
    </spirit:componentInstance>
    <spirit:componentInstance>
      <spirit:componentRef spirit:name="CACHE"/>
    </spirit:componentInstance>
    <spirit:componentInstance>
      <spirit:componentRef spirit:name="PE1"/>
    </spirit:componentInstance>
    <spirit:componentInstance>
      <spirit:componentRef spirit:name="MEM"/>
    </spirit:componentInstance>
  </spirit:componentInstances>
  <spirit:interconnections>
    <spirit:interconnection   spirit:component1Ref="PE0"
                              spirit:busInterface1Ref="m0"
                              spirit:component2Ref="CACHE"
                              spirit:busInterface2Ref="s0" />
    <spirit:interconnection   spirit:component1Ref="CACHE"
                              spirit:busInterface1Ref="m0"
                              spirit:component2Ref="MEM"
                              spirit:busInterface2Ref="s0" />
    <spirit:interconnection   spirit:component1Ref="PE1"
                              spirit:busInterface1Ref="m0"
                              spirit:component2Ref="MEM"
                              spirit:busInterface2Ref="s1" />
  </spirit:interonnection>
</spirit:design>
```

FIG. 18

```
Move(A @ PE0, A @ PE1)

MemoryBarrier @ PE0
CacheClean(A) @ PE0
Load(A) @ PE1
```

FIG. 19

```
Char x[1000] @ MEM1 int main(){ foo(x) @ PE0
    bar(x) @ PE1
}
```

FIG. 20

MAPPING A COMPUTER PROGRAM TO AN ASYMMETRIC MULTIPROCESSING APPARATUS

This application claims the benefit of Provisional Application No. 60/853,756, filed Oct. 24, 2006, the entire content of which is hereby incorporated by reference in this application.

BACKGROUND OF THE INVENTION

1. Field of the Invention

This invention relates to the field of data processing systems. More particularly, this invention relates to the mapping of computer programs to an asymmetric multiprocessing apparatus.

2. Description of the Prior Art

It is known to provide symmetric multiprocessing systems, such as dual-core Intel 80×86-based systems running Linux.

The mapping of portions of the code to be executed to the processors is handled by the operating system and assisted by hardware support. Having identical processors and a single, coherent memory system make it possible for the operating system to dynamically allocate a part of the program to an idle processor. However, such systems represent a significant hardware and power consumption overhead.

Other systems such as MIT's RAW processor, provide a number of identical processors each with a local memory and the ability to read data from any other memory in the system. (IBM's Cell processor has slightly more diversity: it has one control processor and many identical BE engines).

The uniformity of the hardware in such systems greatly simplifies the task of mapping an application onto this hardware allowing the programmer to focus on strategic decisions (e.g., what is the most efficient way to implement an application). However, these approaches are not flexible enough to work well with less uniform hardware.

Asymmetric multiprocessing systems (AMP) have much less uniformity, both in processor type and capability and in the memory hierarchy. This lack of uniformity is typically handled by creating multiple separate programs (one per processor) and creating communication protocols to communicate between these programs. In some systems, communication protocols are provided such as Remote Procedure Calls and data transfer protocols e.g. Phillips' TTL (P van def Wolf et al, Design of embedded microprocessors: An interface-centric approach, In Proceedings of International Conferences on Hardware/Software Codesign and System Synthesis (CODES+ISSS'04), 2004).

These and other mechanisms provide the mechanisms to map an application onto a particular AMP system taking advantage of and coping with any idiosyncrasies of the hardware. However, porting an application to an AMP system or porting a mapped application to a different AMP system or changing the way that an application is mapped onto the current AMP system is both time consuming and very error-prone because the changes needed to map an application to a given system are distributed across the whole system.

Where it is desired to make such applications portable between AMP systems, this is typically achieved by separating configuration information, such as the address range to which a variable is allocated, from the application to make it easy to change the configuration. This requires effort both to make parts of the application configurable to deal with the expected range of system variation and it requires effort to produce configuration data which must accurately reflect each particular system that the system must run on.

Though it is desirable to detect errors in configuration data, this is hard to do because the configuration data lacks the semantic information required to allow an error to be detected. For example, on some AMP systems it is an error for two variables to be assigned to the same address but if the variables are assigned to different memories it is not an error or if the variables are accessed by different processors which have different address maps, then the variables may be at different physical memory locations and, again, it is not an error or if the variables lifetimes do not overlap, then it is not an error. Thus, whilst low-level mechanisms can be used to create portable software, they are time-consuming, error-prone and the software is configurable in only a few dimensions.

Another type of communication model used in AMP systems is distributed object models such as Microsoft's COM and the Object Management Group's CORBA as, for example, in ST Microelectronics MultiFlex (Paulin et al, Parallel Programming Models for a Mulitprocessor SoC Platform Applied to Networking and Multimedia, IEEE Transactions on VLSI, Vol 14, no 7, pp 667-680, July 2006). These higher level models are typically less error-prone and increase portability, but these advantages come at the price of reduced performance or requiring more hardware support. For example, ST Microelectronics MultiFlex makes it easy to move a task from one processor to another by requiring Object Request Broker hardware to route messages to whichever processor is executing a task.

Low power, high performance data processing systems increasingly use asymmetric multiprocessing (AMP) and private memories, lack memory coherence and contain fixed function and/or programmable accelerators. Such systems can provide an advantageous combination of high performance with low cost and low power consumption. However, such systems are complex architecturally and there are a great variety of ways in which such systems may be formed. This causes problems for programmers of such systems.

A programmer of such systems may have to port a given application to a variety of systems which differ in architecture in a manner which requires significant alterations in the program and the way in which the program operates. Such programming of asymmetric multiprocessing systems is time consuming, expensive and error-prone.

Furthermore, there is a wide variety of possible design choices in the way in which a given program can be mapped upon an asymmetric multiprocessing system which is to execute that program. The large number of such possibilities and the effort required to produce programs embodying these possibilities mean that only a small proportion of the number of possible designs tend to be explored. Accordingly, there is a significant likelihood that the way in which a computer program is mapped upon an asymmetric multiprocessing system will be sub-optimal.

Thus, the prior art either relies on hardware support to make multiprocessors look more uniform, imposes a significant performance penalty due to using software libraries to make multiprocessors look more uniform, or they require programming in a way that is time-consuming, error-prone and provides limited portability.

SUMMARY OF THE INVENTION

Viewed from one aspect the present invention provides a computer implemented method of transforming a source computer program to form a transformed computer program for distributed execution upon a plurality of execution mechanisms of an asymmetric multiprocessing apparatus having an asymmetric memory hierarchy including a plurality of memories, said method comprising the steps of:

receiving as an input variable an at least partial architectural description of said asymmetric multiprocessor apparatus including data identifying:
(i) said plurality of execution mechanisms;
(ii) said plurality of memories; and
(iii) a communication path topology indicating which of said plurality of memories are accessible by which of said execution mechanisms; and in dependence upon said at least partial architectural description, adding mapping support to said source computer program to adapt said source computer program for execution upon said asymmetric multiprocessing apparatus as part of forming said transformed computer program.

The present technique recognises that it is possible to provide as an input variable to a computer program implemented tool an at least partial architectural description of such an asymmetric multiprocessing apparatus and use this in generating a transformed computer program from a source computer program with the addition of mapping support to the source computer program in a manner which adapts the transformed computer program for execution upon the asymmetric multiprocessing apparatus. The at least partial architectural description is a substantially fixed input variable to the method and includes an identification of a plurality of execution mechanisms, a plurality of memories forming an asymmetric memory hierarchy and a communication path topology indicating which of the plurality of memories are accessible by which of the execution mechanisms. Adding mapping support in dependence upon these aspects of the at least partial architectural description goes a significant way towards performing the required mapping of the computer program to execute upon the asymmetric multiprocessing architecture and renders this process quicker, less expensive and less error-prone. It also frees the programmer to concentrate on more strategic aspects of the mapping, such as which portions will execute upon which execution mechanisms and which data will be stored within which memories, whilst leaving the task of providing appropriate mapping support within the computer program to reflect these design decisions to the tool of the present technique.

It will be appreciated that the mapping support can take a wide variety of different forms. Particularly useful forms of mapping support which can be added by the tool of the present technique include the addition of cache flush commands to invoke cache flush operations, such that data can be updated within a higher order memory prior to that data being accessed by a different execution mechanism. Another example of mapping support which can be added by the present tool in association with cache memories is a cache invalidate command which invalidates the contents of a cache memory when a higher order memory storing that same data has been updated by a different execution mechanism thereby rendering out-of-date the copy of that data stored within the cache memory.

An efficient way of managing data transfers within such asymmetric multiprocessing systems is to provide a DMA unit. Within such systems, the tool of the present technique can be used to generate DMA commands inserted so as to provide access to data held within a source memory to an execution mechanism not having access to that source memory by copying that data to another location to which the execution mechanism does have access.

A further form of mapping support which can be added by the tool of the present technique is interaction commands which invoke interaction between different execution mechanisms. Such interaction commands are often needed to coordinate the activities of the different execution mechanisms which may be sharing in the execution of an overall program.

The mapping support provided by the tool of the present technique can also include indications of which execution mechanisms should execute which portions of the program, and which memories should store which data items. These references can be exact in specifying an individual execution mechanism or memory or may be abstract in specifying a group of possible execution mechanisms or memories. It will be appreciated that such data could be provided by the programmer as part of their strategic decisions as to how the program is to be executed upon the asymmetric multiprocessing system as well as allowing the tool of the present technique to add/infer such mapping support when it is not already present.

The at least partial architectural description can include information regarding the respective processing capabilities of the execution mechanisms (e.g. floating point support, vector support, etc) and the addition of the mapping support may be dependent upon these processing capabilities. In this way, the tool of the present technique can map the program to the target asymmetric multiprocessing system in a manner dependent upon the processing capabilities of the elements thereof when such mapping information is not provided by the programmer.

Further mapping support data which can be added by the tool of the present technique includes whether a data item should be stored in a specific memory region, whether a data item should be double buffered and the like.

It will be appreciated that the at least partial architectural description could take a variety of different forms. Particularly suitable forms are a IP-XACT description and a SoC designer model.

The execution mechanisms may also take a wide variety of different forms within such an asymmetric processing system including a general purpose processor, a direct memory access unit, a coprocessor, a VLIW processor, a digital signal processor and/or a hardware accelerator unit.

The asymmetric memory hierarchy can also comprise one or more of a global shared memory accessible to all of the execution mechanisms, a shared memory accessible to at least two of the execution mechanisms and a private memory accessible to one of the execution mechanisms. Examples of private memories would include cache memories, scratchpad memories and tightly coupled memories accessible to a single execution mechanism.

Another aspect of the present invention provides a computer implemented method of verifying a computer program for distributed execution upon a plurality of execution mechanisms of an asymmetric multiprocessing apparatus having an asymmetric memory hierarchy including a plurality of memories, said method comprising the steps of:

receiving as an input variable an at least partial architectural description of said asymmetric multiprocessor apparatus including data identifying:
(i) said plurality of execution mechanisms;
(ii) said plurality of memories; and
(iii) a communication path topology indicating which of said plurality of memories are accessible by which of said execution mechanisms;

in dependence upon said at least partial architectural description, verifying mapping support within said computer program to detect if said computer program is validly mapped for execution upon said asymmetric multiprocessing apparatus; and generating verification information in dependence upon said verifying step.

A complementary aspect of the same inventive concept to that described above is the provision of a tool which is able to verify the correctness and/or completeness of mapping data present within a computer program in dependence upon an at least partial architectural description of an asymmetric multiprocessing system. Such a technique may be used in combination with or separately from the tool which is able to automatically add mapping support using the at least partial architectural description as an input variable.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates an at least partial architectural description of the system of FIG. 1;

FIG. 5 illustrates the adding of mapping support to a computer program using exact inference;

FIG. 6 schematically illustrates the adding of mapping support to a computer program using non-exact inference;

FIG. 9 illustrates variable splitting after performing a data flow analysis;

FIG. 10 illustrates the adding of mapping support to a computer program using inference;

FIG. 16a shows a simple computer program annotated according to an embodiment of the present invention;

FIG. 16b shows the maximal set of threads for the program of FIG. 4a.

FIG. 17 schematically illustrates an asymmetric multiprocessing apparatus with an asymmetric memory hierarchy;

FIG. 18 illustrates an architectural description;

FIG. 19 illustrates a communication requirement; and

FIG. 20 illustrates communication support.

DESCRIPTION OF THE PREFERRED EMBODIMENTS

Figure 1:
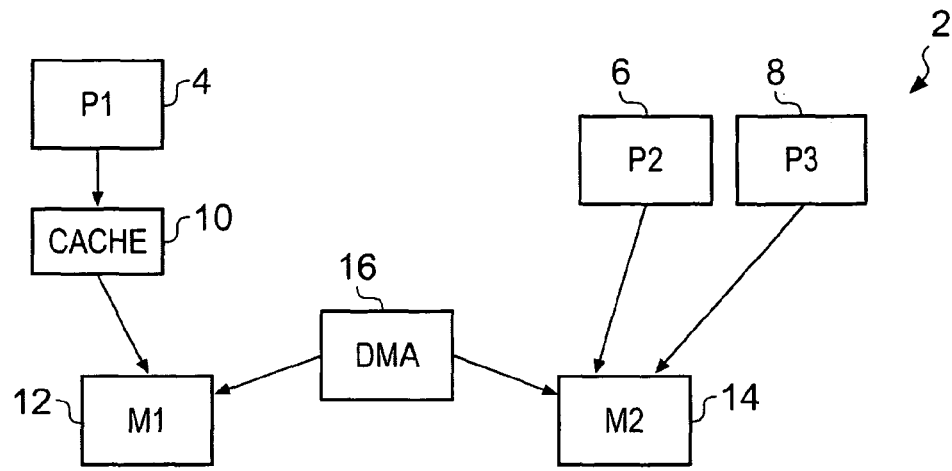
FIG. 1 schematically illustrates a first example asymmetric multiprocessing apparatus.

FIG. 1 illustrates a first example asymmetric multiprocessing apparatus 2. The asymmetric multiprocessing apparatus 2 includes a plurality of execution mechanisms 4, 6, 8. These execution mechanisms may, for example, be selected from the group comprising a general purpose processor, a coprocessor, a VLIW processor, a direct memory access unit, a digital signal processor and a hardware accelerator unit. It will also be appreciated that other forms of execution mechanism may equally well be provided. Associated with the execution mechanism 4 is a cache memory 10. Above this in the memory hierarchy is a private memory 12. The private memory 12 is accessible by the execution mechanism 4, but is not directly accessible by either the execution mechanism 6 or the execution mechanism 8. The execution mechanism 6 and the execution mechanism 8 are connected to a shared memory 14. A direct memory access unit 16 is connected to both the private memory 12 and the shared memory 14. The direct memory access unit 16 can be used to move data between these memories 12, 14, when access to that data is required by one of the execution mechanisms 4, 6, 8 which does not have access to the data within the memory or memories where it is currently stored. The example asymmetric multiprocessing apparatus 2 illustrated in FIG. 1 does not have a global shared memory, but such a global shared memory could be provided which was accessible to all of the execution mechanisms 4, 6, and 8.

In the example asymmetric multiprocessing apparatus 2 of FIG. 1 there is no overall control processor responsible for the scheduling of processing operations between the respective execution mechanisms 4, 6, 8. In this arrangement, the individual execution mechanisms 4, 6, 8 are programmed to be responsible for coordinating their activities through interaction commands, such as issuing synchronous remote procedure calls to one another.

Figure 2:
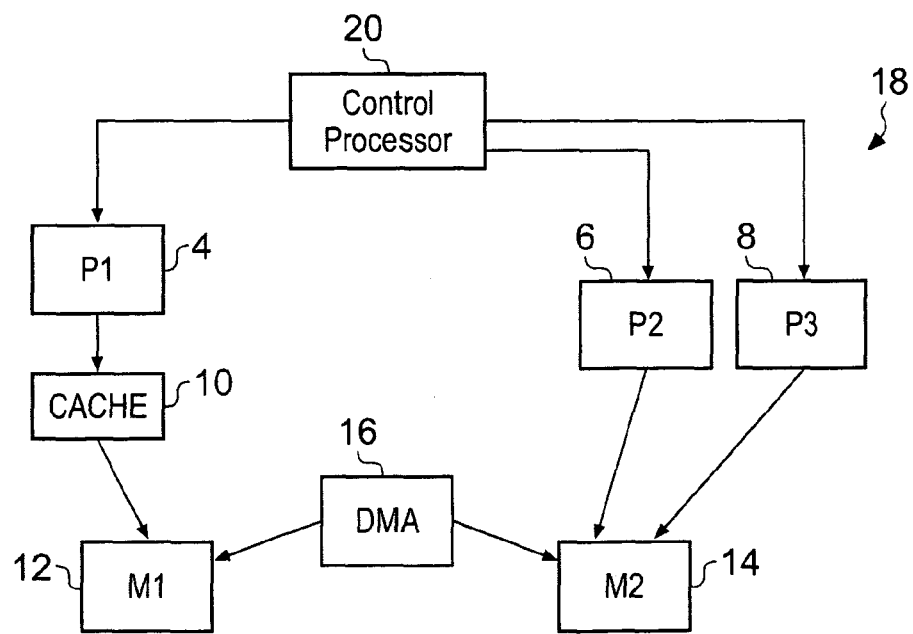
FIG. 2 schematically illustrates a second asymmetric multiprocessing apparatus.

FIG. 2 schematically illustrates a second example asymmetric multiprocessing apparatus 18. This example is the same as the example of FIG. 1, except for the addition of a control processor 20, which is responsible for scheduling the different processing operations performed by the execution mechanism 4, 6, 8. In this arrangement, the control processor 20 can be considered to perform the role of a "dealer" in handing out processing tasks to be performed by the different processing mechanisms 4, 6, 8 in dependence upon the capabilities of those execution mechanisms 4, 6, 8, as well as factors such as the current processing load upon those execution mechanisms 4, 6, 8.

FIG. 3 is a schematic illustration of a partial architectural description of the asymmetric multiprocessing apparatus 2 of FIG. 1. This example uses the SPIRIT description language. It may also be provided in the form of a SoC designer description of the architecture in accordance with the description used within the SoC tools produced by ARM Limited of Cambridge, England. Other forms of at least partial architectural description may also be used.

The upper portion of FIG. 3 identifies the execution mechanisms present and the memories present. The lower portion of FIG. 3 represents the communication path topology of the asymmetric memory hierarchy, e.g. which memories are connected to which ports of which execution mechanisms and other devices. This partial architectural description can be used to algorithmically infer many items of mapping support to be added to source computer program code to generate transformed computer code suitable for execution upon an asymmetric multiprocessing apparatus. As examples, the at least partial architectural description can be used to infer the need to add commands such as cache flush commands, cache invalidate commands, DMA commands and the like necessary to ensure appropriate data coherence between multiple copies of data within the system and appropriate access to data within the system by the execution mechanisms 4, 6, 8 with which it is desired to process that data. It will be appreciated that the at least partial architectural description illustrated in FIG. 3 is a given input variable to the tool of the present technique. As a real life example, various asymmetric multiprocessing apparatuses may be available in the form of off-the-shelf integrated circuits or designs and the task of the tool of the present technique is to simplify the mapping of a computer program onto such systems or a variety of such systems.

Figure 4:
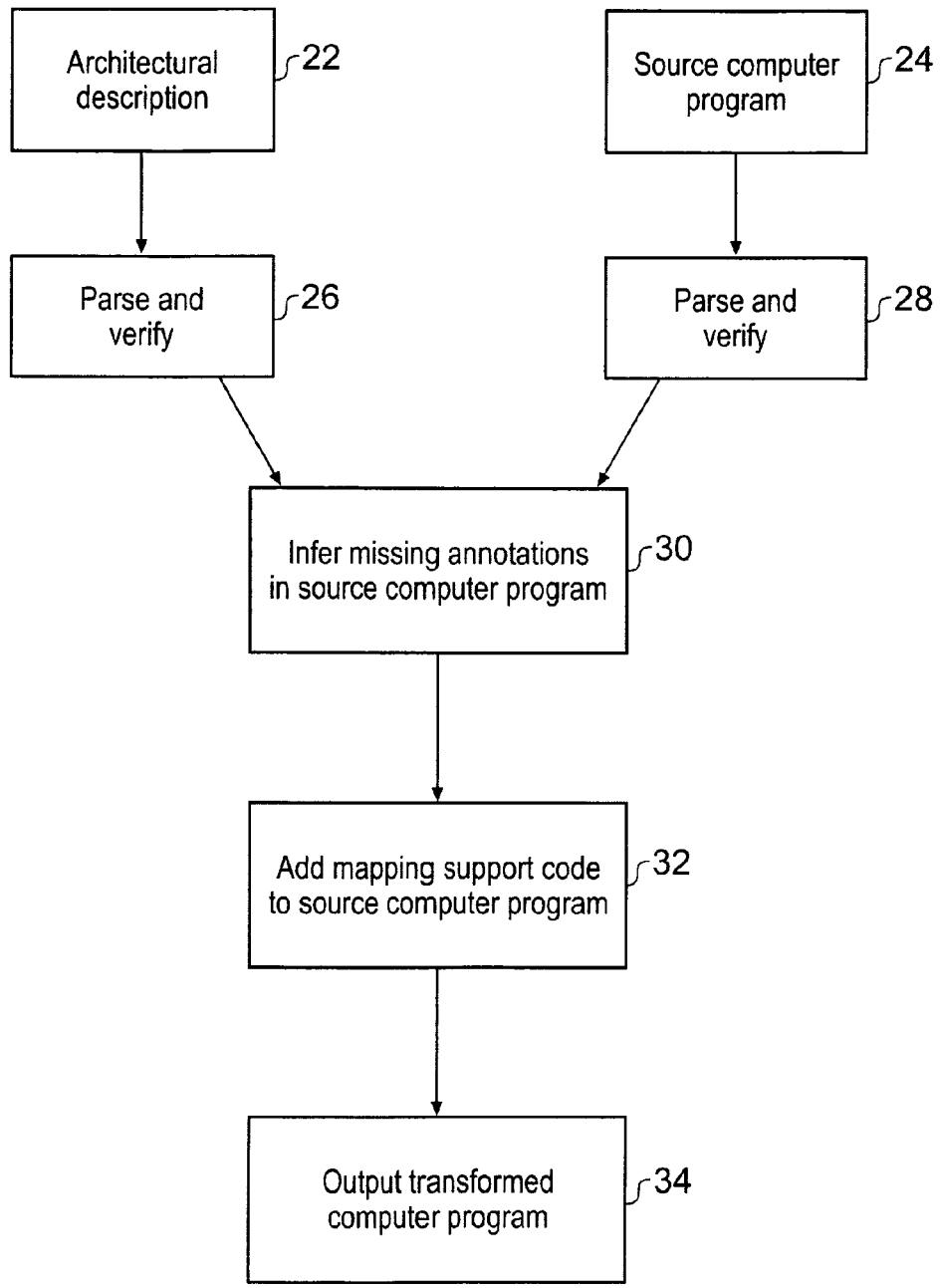
FIG. 4 schematically illustrates a data flow diagram corresponding to a technique of adding mapping data to a source computer program in dependence upon an at least partial architectural description.

FIG. 4 schematically illustrates an example data flow in accordance with the present technique. Inputs to the data flow comprise an at least partial architectural description 22 and a source computer program 24. These are respectively parsed and verified for their internal consistency at blocks 26 and 28. The processing at block 30 serves to infer missing mapping support (annotations) in the source computer program upon the basis of the at least partial architectural description 22 which has been provided as an input. As an example, the source computer program may only partially specify by way of annotations which portions of that computer program are to execute upon which execution mechanism 4, 6, 8. The tool of the present technique at block 30 may infer further annotations specifying either exactly or abstractly (i.e. a group of possible execution mechanisms) the execution mechanism to be used for the given processing operation. A further example would be the memory which is to be used to store a given data item. Within the source computer program a variable may be instantiated by a program instruction, but it may not be specified in which memory that variable is to be instantiated. The tool of the present technique uses the at least partial architectural description 22 and the source computer program to determine which execution mechanisms will require access to that variable and accordingly instantiate that variable in an appropriate memory which is accessible to that execution mechanism. It may be that more than one execution mechanism requires access to a give variable and in this circumstance multiple copies can be instantiated and copy commands inserted in order to synchronise the copies at necessary points within the program flow where synchronisation of the variable is required. This mapping support which is added to the source computer program can be determined by the computer implemented method of the present technique in a way which significantly unburdens the programmer from such time consuming and error-prone considerations.

At block 32 mapping support code is added to the source computer program based upon the annotated source computer program formed at block 30 in accordance with the indications within that annotated source computer program as to which execution mechanisms are to execute which portions of the computer program, where synchronisation between data items is required, which memories are storing which data items, etc. The mapping support code can include the addition of commands serving to initiate cache flush operations, cache invalidate operations, DMA copy commands and the like. The mapping support code can also include commands which invoke interaction between the execution mechanisms 4, 6, 8, such as one execution mechanism informing another execution mechanism when it has completed a given processing task thereby indicating that the output data from that processing task will now be available for further processing by that different execution mechanism.

At block 34 the transformed computer program which has the missing annotations added to it and the additional mapping support code added to it is output as a transformed computer program. This transformed computer program may be in the form of an executable computer program at this stage, or may alternatively require additional compilation to form executable code targeted for the particular execution mechanisms 4, 6, 8. An example of mapping support which could be added to the source computer program 24 to form the transformed computer program 34 can be specifies indicating which compilers are to be used to compile which portions of the computer program appropriate to the execution mechanisms 4, 6, 8, which has been selected for that portion of the computer program.

FIG. 5 illustrates some example source computer program code 36 which is subject to an exact inference process adding annotations to that source computer program 36 and then is subject to the addition of further mapping support in the form of additional commands to adapt the source computer program 36 to the communication path topology between the execution mechanisms which are provided and the memories which are provided.

Within the input source computer program 36 it will be seen that the annotations to that source computer program 36 do not include a specifier as to where the variable y is to be stored or a specifier as to where the program function foo is to be executed. The data flow block 30 of FIG. 4 can be used to derive from the at least partial architectural description 22 the missing annotations within the source computer program 36 appropriate to the asymmetric multiprocessing apparatus upon which the source computer program is to be mapped. Thus, as it has been specified within the input source computer program 36 that the variable x is to be stored within the memory M1, it is appropriate for the function foo to be executed by an execution mechanism P1 coupled to that memory M1. This additional annotation is inferred and added to the source computer program as part of forming the transformed computer program. In a similar way, since the function bar to be performed upon the variable y is to be executed by execution mechanism P2, it is appropriate for the variable y to be stored within a memory M2 which is accessible to the execution mechanism P2. This annotation is also added. Finally, as part of the inferring of exact annotations there is specified within the source computer program 36 a program command which copies the variable x to the variable y. However, no mechanism for performing this copy function is specified within the source computer program 36. The at least partial architectural description can be used to determine that in practice, in this example, it is only a DMA unit which has access to both the memory M1 and the memory M2 and accordingly it is appropriate for this DMA unit to perform the copy operation and this is specified within the transformed computer program by the addition of the DMA annotation.

The final portion of FIG. 5 corresponds to the block 32 in FIG. 4. Within this portion commands are added to the computer program appropriate to the at least partial architectural description which has been input to the tool and which can be used to determine mapping support commands which need to be added. In particular, the at least partial architectural description may indicate that the execution mechanism P1 has a cache memory associated with it. Accordingly, in order that the result of the processing of the function foo performed by the execution mechanism P1 should be available within the memory M1 such that it can be copied across the memory M2 by the DMA unit, it is necessary to insert a cache flush command to specify that at least the variable x should be flushed from the cache memory of the execution memory P1 into the higher order memory M1. Furthermore, the copy command which was already present within the computer program and specified as being performed by the DMA unit can be converted into a DMA_MOVE command which can be issued by the execution mechanism P1 to invoke the DMA unit to perform the desired copy operation. This DMA command can be considered as an interaction command in which a required interaction between execution mechanisms (P1 and the DMA unit) of the asymmetric multiprocessing apparatus can be added as part of the mapping support.

It will be seen that the transformed computer program at the bottom of FIG. 5 still includes relatively abstract functions such as foo(x) and bar(y) and these are subject to compilation by compilers matched to the execution mechanisms P1 and P2 respectively to be used for these functions.

FIG. 6 illustrates a further example of the addition of annotation to a source computer program 38. In contrast to the example of FIG. 5, in this case the function bar(y) can be executed on either of the execution mechanisms P2 and P3. Both of these execution mechanisms have access to the memory M2 where the variable y is stored. Accordingly, the execution mechanism specifier can be abstract in the sense that it specifies the group of execution mechanisms (P2, P3) as possible execution mechanisms with the final selection either being made at the compilation stage, or heuristically during execution by a control processor 20 such as is illustrated in FIG. 2. It will be appreciated that the processing which adds additional annotation to the computer program, and which adds mapping support commands to the computer program, can be responsive to a variety of further aspects of the at least partial architectural description and can add a variety of further mapping support commands to the computer program. Examples of further aspects of the at least partial architectural description which can be used to control the mapping support added include the processing capabilities of the respective execution mechanisms 4, 6, 8 and the storage capacities, speed and capabilities of the memories. A memory specifier may specify that a data item should be stored in a specified region of a memory, such as a protected region, a read only region, or the like as appropriate to the at least partial architectural description or other aspects of the computer program. A memory specifier may also indicate that a data item should be double buffered if this is appropriate to the communication path topology specified within the at least partial architectural description.

Figure 7:
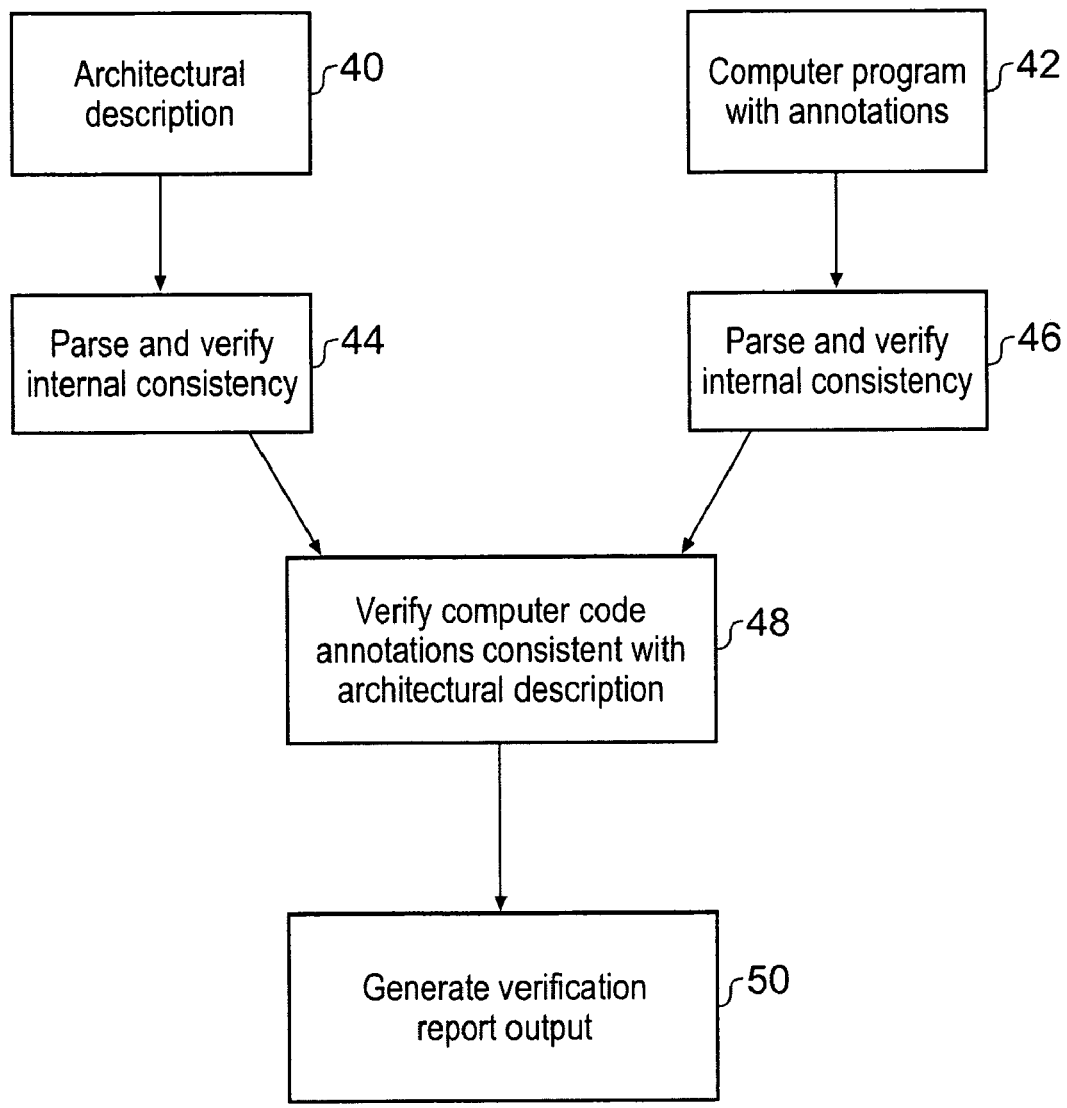
FIG. 7 schematically illustrates a data flow associated with verifying mapping support within a computer program for adapting that computer program to execute upon asymmetric multiprocessing apparatus.

FIG. 7 schematically illustrates a data flow associated with a complementary aspect of the present technique used to verify the completeness and/or correctness of mapping support present within a computer program for its target asymmetric multiprocessing apparatus. Inputs to this data flow comprise an at least partial architectural description 40 of the target asymmetric multiprocessing apparatus together with a computer program 42 which is intended to be fully annotated and contain a full set of correct mapping support commands. Processing blocks 44 and 46 respectively parse these two inputs and verify the internal consistency of the data which they contain. The two inputs are then passed to processing block 48 at which the computer code annotations and the mapping support commands therein are checked/verified for their consistency with the at least partially architectural description 40 which has also been provided as an input. As an example of such a check, the at least partial architectural description will indicate which memories are accessible to which execution mechanisms. The computer code can then be checked to determine if it includes any commands in which an execution mechanism is attempting to access a memory in circumstances where the at least partial architectural description indicates that the execution mechanism concerned does not have access to that memory. Other examples would be the presence of a cached copy of a variable within the system when another copy of that variable is updated and yet a cache invalidation command is not found to indicate that the cached version should be marked as invalid as a consequence of the update which has occurred elsewhere. Further examples of verifications and checks which can be performed using the at least partially architectural description and the annotated computer program with embedded mapping support commands will be apparent to those in this technical field.

At processing block 50, a verification report is output indicating whether any aspects of the computer program 42 input to the process flow are inconsistent with the at least partial architectural description 40 which is also input to that data flow.

Figure 8:
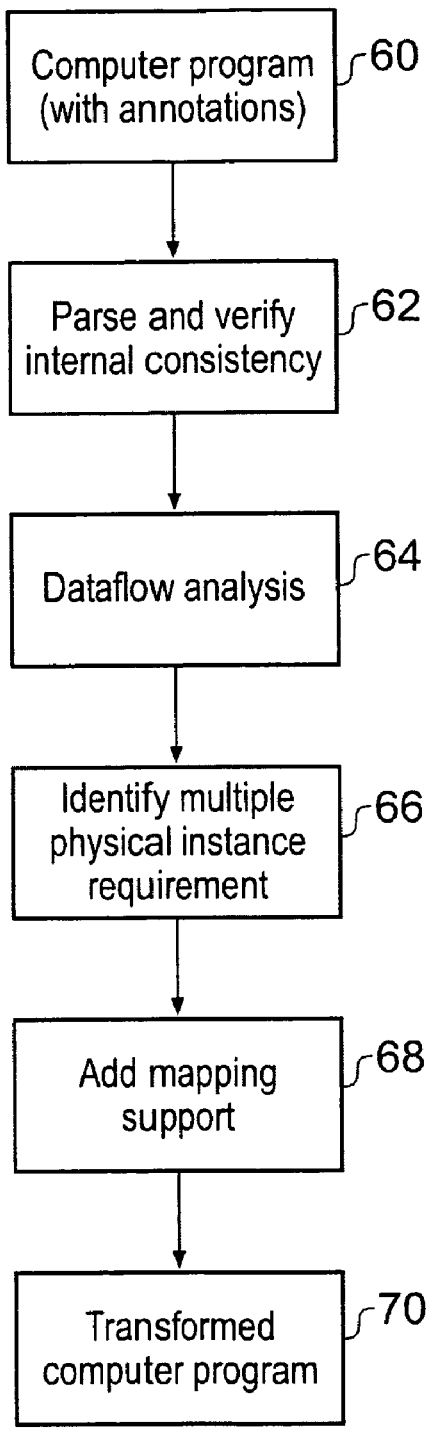
FIG. 8 schematically illustrates a data flow diagram corresponding to a technique of adding mapping support to a source computer program in dependence upon the identification of at least one multiple-physical instance requirement for at least one logical variable in a source computer program.

FIG. 8 schematically illustrates an example data flow in accordance with the present technique. The input to the data flow comprises a source computer program 60. This source computer program 60 may have been annotated to a greater or lesser extent by the programmer, depending upon his knowledge of the architecture of the data processing apparatus on which the program is to be run, his desire to explicitly specifying particular mapping support commands and so on. This input computer program is parsed and verified for its internal consistency at block 62. The processing at block 64 serves to analyse the use of variables in the source computer program within the context of the data processing apparatus upon which the computer program is to be executed. For example, the data flow analysis may reveal that a particular logical variable in the computer program will need to be available to execution mechanisms 4 and 6. Correspondingly, the processing at block 66 would then identify a multiple physical instance requirement for that logical variable, in so far as a physical copy of this variable will need to be stored in each of memories 12 and 14. Thus, at block 68, mapping support is added to the source computer program, as required, to instantiate a copy of this variable in each of memories 12 and 14, and copy commands are also inserted in order to synchronise the copies at necessary points within the program flow where synchronisation of the variable is required. As an example, this copying may be achieved by means of DMA 16. Finally, a transformed computer program is generated at block 70, incorporating the necessary mapping support to implement the source computer program on the data processing apparatus. This mapping support which is added to the source computer program can be determined by the computer implemented method of the present technique in a way which significantly unburdens the programmer from such time consuming and error prone considerations.

FIG. 9 illustrates some example source computer program code 72 which is subject to a data flow analysis and the addition of mapping support in the form of variable splitting to adapt the source computer program 72 for execution on the data processing apparatus.

Within the input source computer program 72 it will be seen that the programmer has indicated that two physical copies of variable x should be instantiated, that the function foo should operate on the first copy, that the function bar should operate on the second copy and that the two copies should be synchronised between the execution of these two functions. This might have been done, for example, where the programmer knows that function foo will be performed on processor P1 4 and function bar will be performed on processor P2 6. The data flow block 64 of FIG. 8 is performed and at block 66 of FIG. 8, the multiple physical instance requirement for variable x is identified (essentially confirming the programmer's short hand indication of this fact in the source computer program). At block 68 of FIG. 8 the necessary mapping support is then added to the source computer program, in this example by splitting variable x into two physical copies (x_copy1 and x_copy2), selecting the required one of these physical copies to be operated on by functions foo and bar and replacing the SYNC command by an explicit copy command specifying the required direction of this synchronisation copy.

FIG. 10 illustrates a further example of the addition of mapping support to a source computer program 76. In this example input source computer program 76 is intended to be executed on a data processing apparatus such as that illustrated in FIG. 1. In input source computer program 76 no annotations have been provided by the programmer. Thus, in this example, in the data flow analysis block 64 of FIG. 8 it is established that function foo should be executed on execution mechanism 4, whilst function bar should be executed on execution mechanism 6. This then means that a copy of variable x must be stored in each of the memories 12 and 14, and this multiple physical instance requirement is identified by data flow block 66 of FIG. 8. The processing of data flow block 68 of FIG. 8 then adds the necessary mapping support to enable source computer program 76 to execute on data processing apparatus 2. In FIG. 10 this is illustrated in two stages. Firstly, as illustrated by intermediate transformed computer program 78, conceptual annotations are added to source computer program 76, indicating the necessary additions to enable execution of this program. These are: instantiating a copy of variable x in each memory (copy1 in M1 and copy2 in M2); function foo executing on processor P1 on copy 1 of variable x; synchronising variable x thus amended by means of the DMA; and executing function bar on processor P2 on copy2 of variable x. Final stage transformed computer program 80 then illustrates the fully transformed computer program which: instantiates a copy of x in memory 1; instantiates a copy of variable x in memory 2; performs function foo on processor P1 on the M1 copy of variable x; uses the DMA to copy the M1 copy of variable x to M2; and performs function bar on processor P2 on the M2 copy of variable x.

Figure 11A:
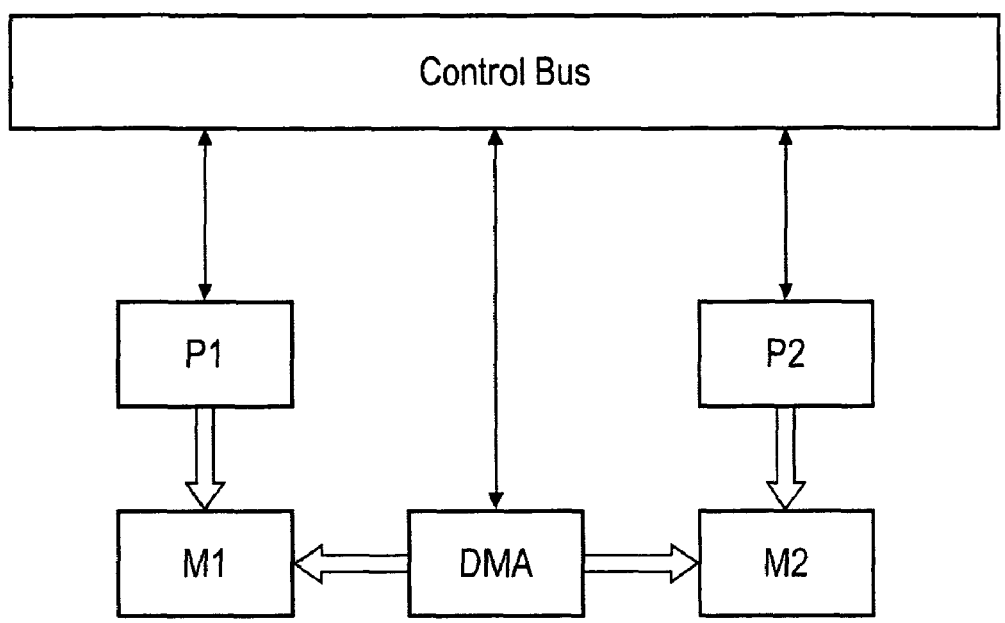
FIG. 11A schematically illustrates a data processing system which can use multiple copies of the same variable.

High performance, low power embedded systems often have multiple processing elements and distributed memory systems and employ DMA engines to copy data from one memory to another. FIG. 11A illustrates such a system.

In such systems, processing elements (PEs) typically have access to a subset of the total memories in the system and data produced on one processor is often not directly accessible by other processors: it must be explicitly copied from a memory accessible by the producer PE over to a memory accessible by the consumer PE. That is, one must perform the following sequence of operations:
1. Run function to generate data on PE P1, writing result to a variable X1 in memory
2. Use DMA engine to copy variable X1 in memory M1 over to another variable X2 in memory M2.
3. Run function to consume data on PE P2, reading inputs from variable X2 in memory M2.

On a system where all PEs can access all memory, the same result could be achieved with the following sequence (we assume that PEs P1 and P2 can both access memory M1):
1. Run function to generate data on PE P1, writing result to a variable X in memory M1.
2. Run function to consume data on PE P2, reading inputs from variable X in memory M1.

Comparing the two sequences, one can see that to use distributed memory, one must:
1. Split the variable X into two separate variables X1 and X2.
2. Insert copy operations to copy the value of X1 over to X2.

Both changes have a number of negative consequences:
1. Splitting a variable into multiple variables makes it harder for human's to understand the program because instead of seeing a direct flow of data from the generator function to the consumer function, one must reason about the copy or chain of copies used to perform the copy.
2. Splitting a variable into multiple variables makes it harder for tools to analyze and transform the program. For example, instead of performing an operation on variable X, tools must correctly decide which of X1 or X2 currently holds the value of interest and perform the operation on that variable.
3. Inserting DMA copies manually is very error-prone because it is easy to accidentally copy from X2 to X1 when you intend to copy from X1 to X2.
4. Inserting DMA copies manually is error prone because it is easy to forget to insert a DMA copy or to insert a DMA copy in the wrong place in the program.

One aspect of the present technique provides:
1. Annotations to allow the programmer to declare that a variable has multiple versions in different memories; to update possibly invalid versions of a variable from valid copies; and to specify which version is to be used at any point in the program.
2. Checking the use of these annotations to confirm that it does not change the meaning of the program—i.e., that the annotations are used correctly.
3. Inferring annotations to allow the programmer to omit annotations which reduces the annotation burden.
4. Using static analysis of the program to improve the program.
5. Using static analysis of the program when monitoring program behaviour (e.g., debugging or profiling) to determine where the valid references to a variable lie.

Notes:
1. Although the above talks about multiple memories, there may be just one memory. For example, the two processors may both be able to access all memory, but one processor has faster access than another.
2. Likewise, there could be just one processor but, for some reason, certain operations are better done in one memory than in another. For example, if using a scratchpad such as a TCM, one might want to make a temporary copy of a variable in TCM if an operation uses the variable heavily.
3. Finally, there need not be a single DMA engine. Any mechanism for copying the data could be used instead (it is even be possible to avoid the copy) such as using a RISC processor or there may be a chain of DMA engines where each copies into the input region of the next engine.

Notation and Semantics

Before we can describe the techniques further, the following introduces some notation and describes how it can be compiled.

While these techniques can be applied to many programming languages, it is described below in terms of some extensions to the C programming language. The choice of syntax is arbitrary and is not essential to these techniques.

Let us suppose that there is a way of invoking operations on particular processing elements. For example, one might write:

X=produce( )@P1 to invoke a function called 'produce' on processing element P1 and store the result in a variable X.

The present techniques provide some syntax to introduce multiple copies of a variable and indicate which memory they should be allocated in. The syntax used to illustrate this is as follows:

int X@{1=>M1, 2=>M2};

which allocates two versions of a variable X of type 'int' which we will refer to as X@1 and X@2 and which are allocated in memories M1 and M2 respectively.

The techniques also provide some syntax to update a possibly invalid version of a variable from a valid version of the variable. The syntax used to illustrate this is as follows:

UPDATE(X@2,X@1)@DMA;

which invokes the processing element 'DMA' to copy X@1 to X@2.

Using this notation, the example using the system of FIG. 11A can be written as follows:

int X@{1=>M1, 2=>M2};
. . .
X@1=produce( ) @P1;
UPDATE(X@2,X@1)@DMA;
consume(X@2) @P2;

Later parts of the techniques will allow most of the 'placement' annotations (i.e., those beginning with @) to be omitted.

This notation supports the concept of having multiple versions of a variable instead of multiple variables and the idea of viewing copying one variable to another as updating a possibly invalid version of a variable from a valid version of the same variable.

Compilation of these language extensions can be performed as follows:

A declaration of multiple versions of a variable translates to multiple declarations of variables together with an indication to the linker that the variables should be in particular memories.

int X1_attribute_((section(M1_data)));
int X2_attribute_((section(M2_data)));

A reference to a particular version of a variable translates to a reference to a particular variable (e.g., X@1 is translated to X1).

An UPDATE operation translates to a copy from one version of a variable to another using a particular processing element.

Checking Annotations

These annotations allow the programmer to express the mapping of the program onto the available hardware without obscuring the original intent of the programmer (as would happen if the programmer used two variables X1 and X2). The first benefit of this property is that it allows the compiler to perform checks to ensure that the addition of the annotations does not change the meaning of the program which is performed as follows.

It is common for compilers to track properties of variables which must be true at particular points in a program. For example, if a program sets X to 0 in one statement, a constant propagation analysis can infer that X must be zero at a number of additional points in the program.

The present techniques can use static analyses of this form to identify which versions of a variable are valid at each point in a program. For example, one can apply the following rules:

1. Assigning to a version of a variable, invalidates all versions of the variable except the version assigned to.
2. Performing an update from one version to a second version of the same variable makes the second version valid if the first version was valid. (The update is an error if the first version was not valid or if one variable is updated from a different variable.)
3. If it is possible to reach a point in the program by multiple paths, a version of a variable is only valid at that point if it is valid from all possible paths.

Figure 11B:
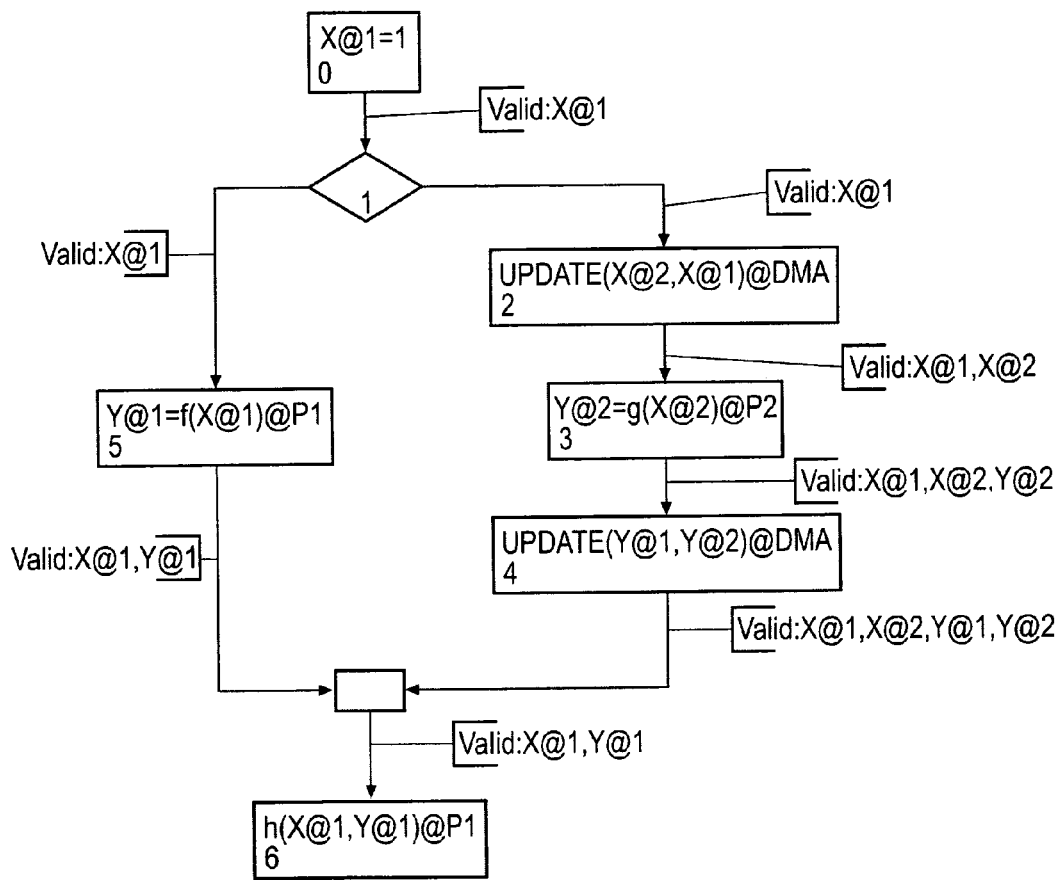
FIGS. 11B and 11C are flowcharts illustrating how annotations can be checked and/or inferred.

For example, in the flowchart of FIG. 11B, edges are annotated with the set of valid variables at each point and nodes are numbered for ease of reference.

After executing node 0, version 1 of X is valid and all other versions are invalid.

After executing the conditional node 1, version 1 of X remains valid in both outgoing edges.

Node 5 is correct because it uses version 1 of X which is valid on the input edge.

After executing node 5, version 1 of X remains valid and version 1 of Y is valid.

Node 2 is correct because it uses version 1 of X which is valid on the input edge.

After executing node 2, version 1 of X remains valid and version 2 of X becomes valid.

Node 3 is correct because it uses version 2 of X which is valid on the input edge. After executing node 3, versions 1 and 2 of X remain valid and version 2 of Y becomes valid.

Node 4 is correct because it uses version 2 of Y which is valid on the input edge.

After executing node 4, versions 1 and 2 of X and version 2 of Y remain valid and version 1 of Y becomes valid.

The outgoing edges from nodes 4 and 5 merge and, after the merge, version 1 of X is valid because it is valid in both edges, version 2 of X is not valid because it is not valid in one of the edges (it is not valid in the outgoing edge of node 5), version 1 of Y is valid because it is valid in both edges, and version 2 of Y is not valid because it is not valid in one of the edges (it is not valid in the outgoing edge of node 5).

Node 6 is correct because it uses version 1 of X and version 1 of Y both of which are valid on the input edge.

If a description of the architecture were available, it would also be possible to check that PE P1 can access the memory that stores version 1 of variables X and Y, that PE P2 can access the memory that stores version 2 of variables X and Y and that the DMA engine can access the memories that store versions 1 and 2 of variables X and Y.

Inferring Program Annotations

The above examples contain a large number of annotations. In practice, it is possible to substantially reduce the amount of annotation required by inferring missing annotations and by applying default rules.

Figure 11C:
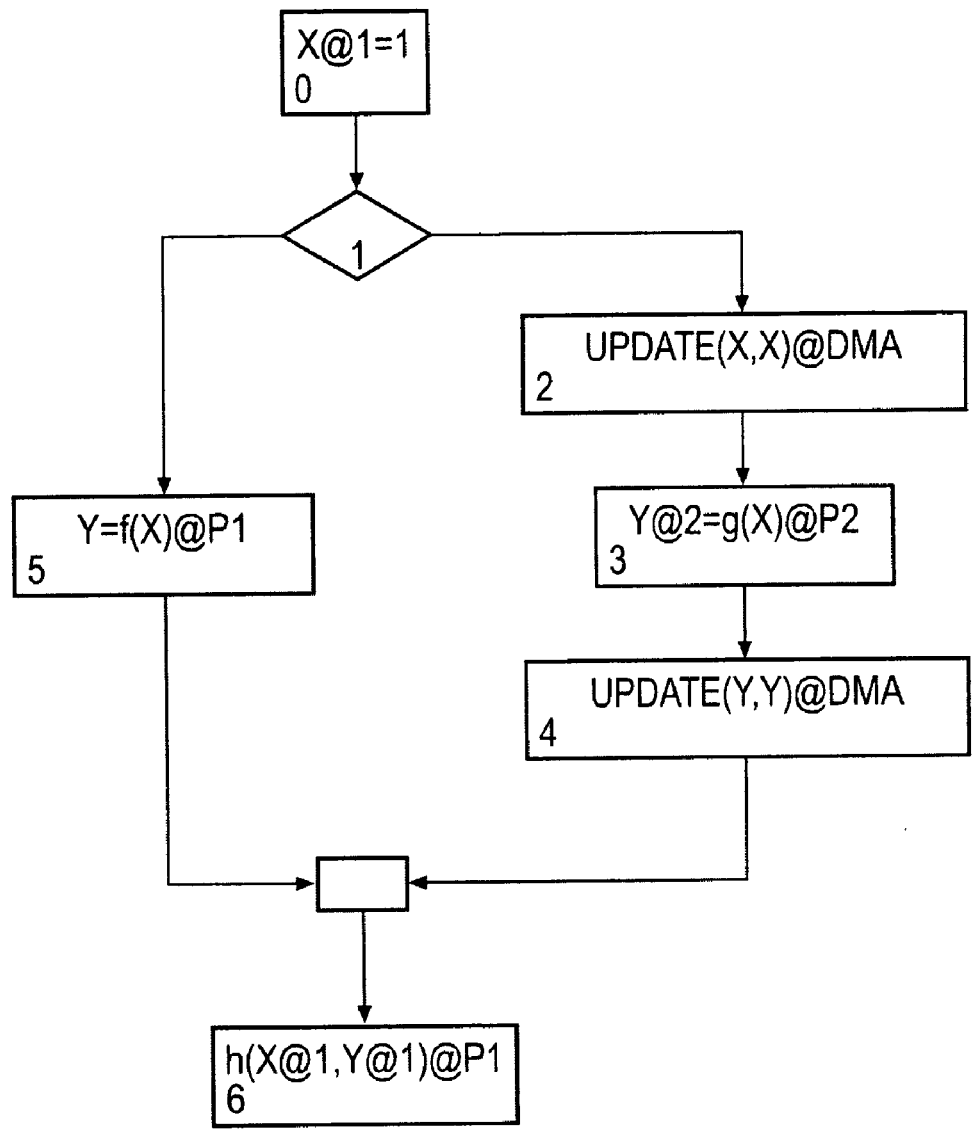

For example, in the flowchart of FIG. 11B, one can infer that the version of X used in nodes 2 and 5 must be version 1 because that is the only version valid on entry to those nodes. Likewise, one can infer that the version of Y being updated in node 4 must be version 1 because otherwise, the use of Y@1 in node 6 would be invalid. In general, there are multiple minimally annotated forms of the same program. For the above FIG. 11B, one such minimally annotated form is shown in FIG. 11C.

If a description of the hardware architecture were available, it might also be possible to infer further information. For example:

If PE P2 can only access memory M2 and if the only version of Y that is in memory M2 is Y@2, then it is possible to infer the '@2' annotation in node 3.

If only PE P2 can perform operation g, it is possible to infer the '@P2' annotation in node 3.

If only the DMA engine can access both memories M1 and M2, it is possible to infer the '@DMA' annotations in nodes 2 and 4.

If multiple DMA engines can access both memories M1 and M2, there is no unique choice for the UPDATE operations in nodes 2 and 4 but various heuristics could be used to make a reasonable choice:

The programmer could declare which DMA engine is to be used for particular variables or variables with certain properties such as type or size or for all variables. This default rule could be overridden by an explicit annotation on a particular operation.

The compiler could attempt to balance the load on the engines using a static analysis or profile information to determine which engine is most likely to be available at each program point.

Similarly, if multiple PEs can perform operation g and produce a result in memory M2, there is no unique choice of PE to perform the operation in node 3 but programmer-specified defaults or compiler heuristics can be used to make a choice.

The exact set of inferences possible will depend on the particular architecture and on which annotations the programmer chooses to provide.

It is also possible to automatically insert UPDATE operations in certain circumstances. For example, in the original flowchart (i.e., with all the other annotations present), there are only two places where the UPDATE in node 2 can be placed. It can either be placed where it is in the figure (between nodes 1 and 3) or it can be placed between nodes 0 and 1:

It will be appreciated that this approach can be used to manage uploading of programs to instruction memories associated with particular PEs. For example, if the microcode associated with a VLIW processing element is stored off-chip in flash memory and must be copied into the microcode memory used by the VLIW processing engine, before the engine can execute, this can be managed by the present techniques.

Figure 12:
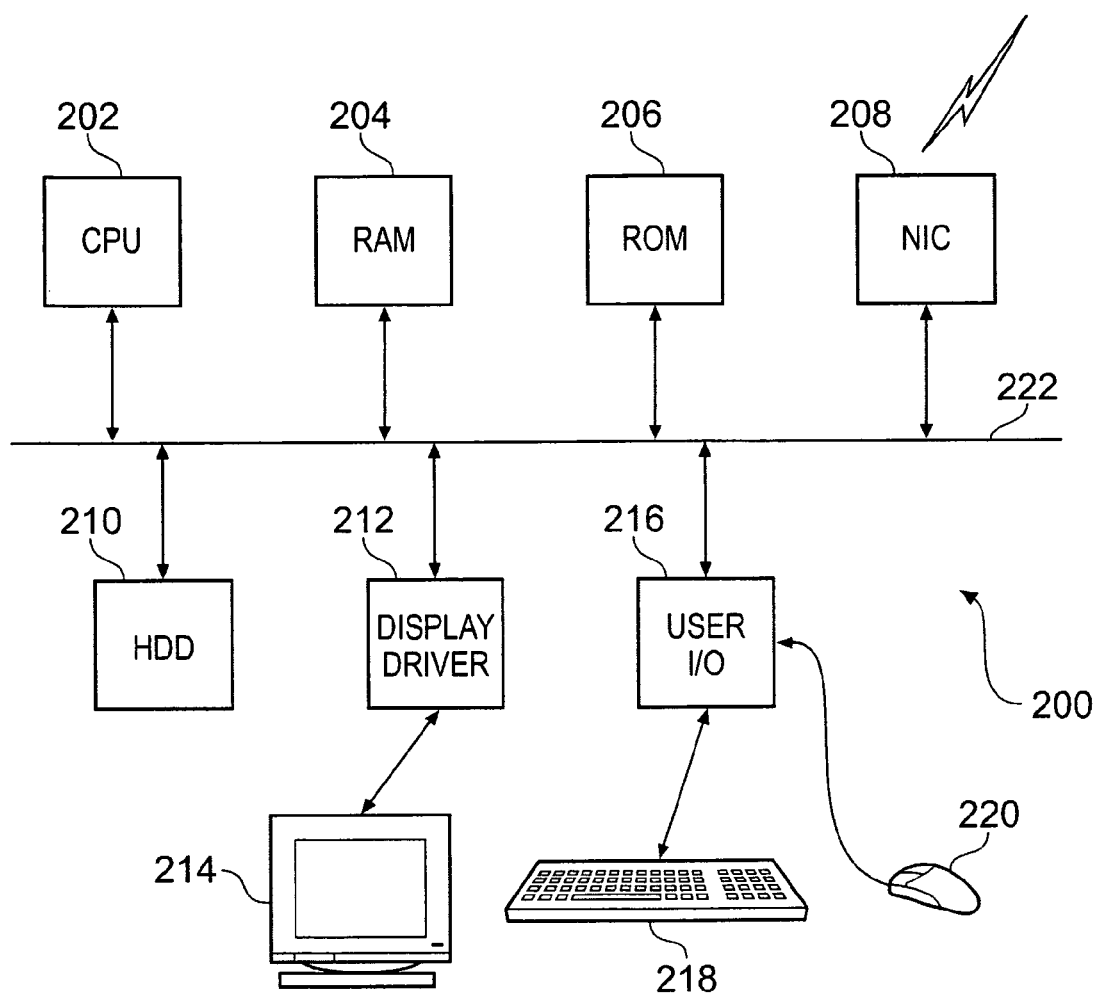
FIG. 12 schematically illustrates a general purpose computer for performing the above described techniques.

FIG. 12 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Figure 13A:
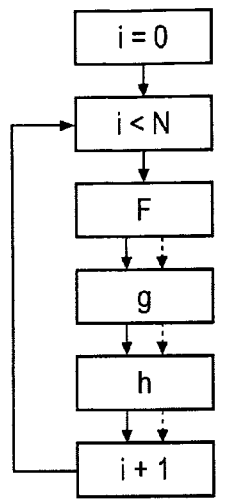
FIG. 13a to d schematically shows the splitting into separately executable sections of a computer program according to an embodiment of the present invention.
Figure 13B:
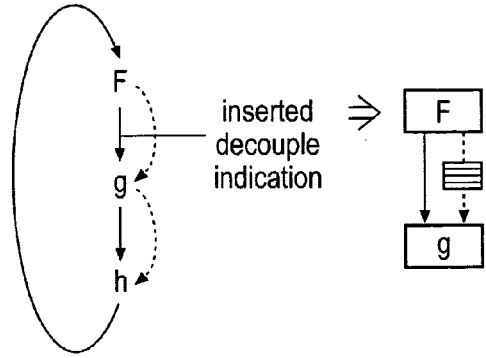

FIG. 13a shows a portion of a computer program comprising a loop in which data items are processed, function f operating on the data items, and function g operating on the data items output by function f and then function h operating on these items. These functions being performed n times in a row for values of i from 1 to n.

Thus, the control flow can be seen as following the solid arrows while data flow follows the dotted arrows. In order to try to parallelise this portion of the computer program it is analysed, either automatically or by a programmer and "decouple" indications are inserted into the data flow where it is seen as being desirable to split the portion into sections that are decoupled from each other and can thus, be executed on separate execution mechanisms. In this case, a decouple indication is provided between the data processing operations f and g. This can be seen as being equivalent to inserting a buffer in the data flow, as the two sections are decoupled by providing a data store between then so that the function f can produce its results which can then be accessed at a different time by function g.

Figure 13C:
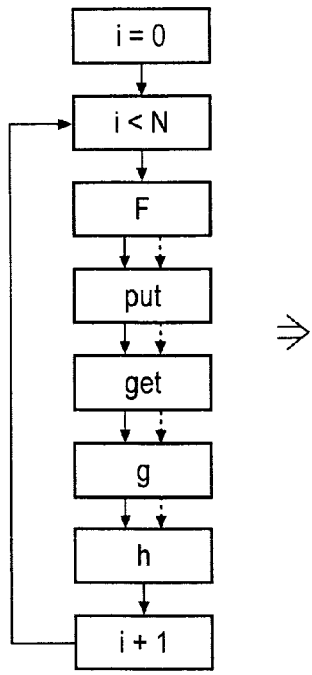

FIG. 13c, shows how the program is amended to enable this decoupling by the insertion of "put" and "get" instructions into the data stream. These result in the data being generated by the f function being put into a data store, from which it is retrieved by the get instruction to be processed by function g. This enables the program to be split into two sections as is shown in FIG. 1d. One section performs function f on the data for i=1 to n and puts it into a buffer data store. The other section then retrieves this data and performs functions g and h on it. Thus, by the provision of a data store the two sections of the program are in effect decoupled from each other and can be executed on separate executions mechanisms. This decoupling by the use of a specialised buffer and extra instructions to write and read data to it, are only required for systems having heterogeneous memory, whereby two execution mechanisms may not be able to access the same memory. If the memory is shared, then the data path between the two sections does not need a data copy but can simply be the provision of a data store identifier. Thus, if the program is being processed by a data processing apparatus having a number of different processors, the two sections can be processed in parallel which can improve the performance of the apparatus. Alternatively, one of the functions may be a function suitable for processing by an accelerator in which case it can be directed to an accelerator, while the other portion is processed by say, the CPU of the apparatus.

Figure 13D:
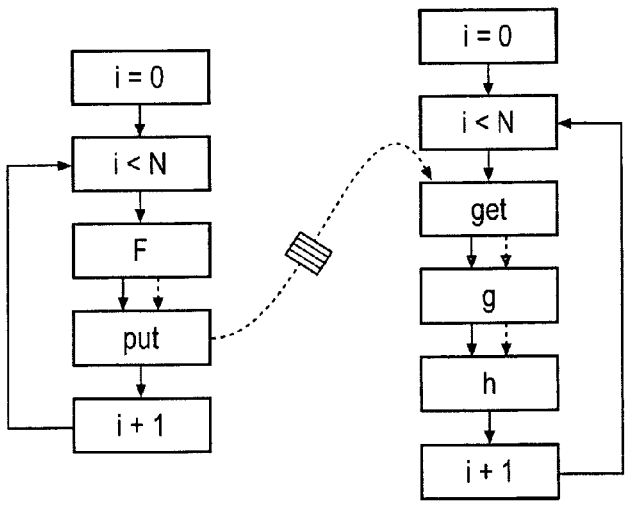

As can be seen from FIG. 13d, the splitting of the program results in the control code of the program being duplicated in both section, while the data processing code is different in each section.

It should be noted that the put and get operations used in FIG. 13c can be used in programs both for scalar and non-scalar values but they are inefficient for large (non-scalar) values as they require a memory copy. In operating systems, it is conventional to use "zero copy" interfaces for bulk data transfer: instead of generating data into one buffer and then copying the data to the final destination, the final destination is first determined and the data directly generated into the final destination. A different embodiment of the invention applies this idea to the channel interface, by replacing the simple 'put' operation with two functions: put_begin obtains the address of the next free buffer in the channel and put_end makes this buffer available to readers of the channel:

void* put_begin(channel *ch);
void put_end(channel *ch, void* buf);

Similarly, the get operation is split into a get_begin and get_end pair
    void* get_begin(channel *ch);
    void get_end(channel *ch, void* buf);
Using these operations, sequences of code such as:
    int x[100];
    generate(x);
    put(ch,x);
Can be rewritten to this more efficient sequence:
    int px=put_begin(ch);
    generate(px);
    put_end(ch,px);
And similarly, for get:
    int x[100];
    get(ch,x);
    consume(x);
to this more efficient sequence:
    int px=get_begin(ch);
    consume(px);
    get_end(ch,px);

The use of puts and gets to decouple threads can be further extended to use where communication between threads is cyclic. Cyclic thread dependencies can lead to "Loss of Decoupling"—that is, two threads may not run in parallel because of data dependencies between them and thus, in devices of the prior art decoupling is generally limited to acyclic thread dependencies.

1. A particularly common case of cyclic thread dependencies is code such as

```
y = 1;
while(1) {
    x = f(y);
    y = g(x);
}
```

Under conventional decoupling schemes, puts are always inserted after assignment to any data boundary variable. This would require both a put outside the loop and a put at the end of the loop:

```
y1 = 1;
put(ch,y1);
while(1) {
    y2 = get(ch);
    x = f(y2);
    y3 = g(x);
    put(ch,y3);
}
```

Conventional decoupling schemes only generate matched pairs of puts and gets (i.e., there is only one put on each channel and only one get on each channel) so they cannot generate such code.

Embodiments of the present invention use an alternative way of decoupling this code and generate:

```
y1 = 1;
while(1) {
    put(ch,y1);
    y2 = get(ch);
    x = f(y2);
```

-continued
```
    y1 = g(x);
}
```

This does have matched pairs of puts and gets but breaks the rule of always performing a put after any assignment to a variable.

Figure 14A:
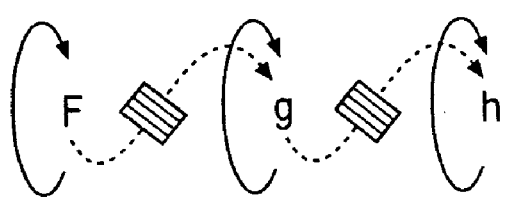
FIG. 14a to b schematically shows a method of splitting and then merging sections of a computer program.
Figure 14B:
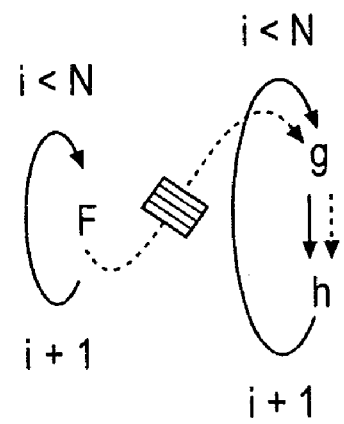

FIGS. 14a and 14b schematically illustrate the program code shown in FIG. 13. In this Figure a data store is provided to decouple functions f and g, but one is not provided between g and h. In this embodiment analysis of the program to decouple it is performed automatically and several potential sections are provided, in this case these are loops having functions f, g and h in them. The automatic analysis then checks that each loop can be executed separately and in this case identifies a missing data path between functions g and h. Thus, these two functions are remerged to provide two sections with a data path between.

Figure 15:
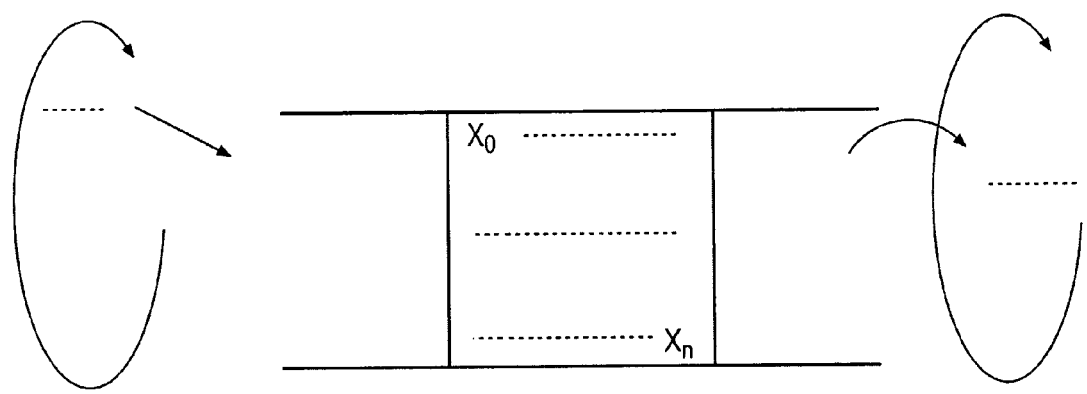
FIG. 15 schematically shows data communication between two sections of a program.

FIG. 15 shows in more detail the data path between the two program sections. As can be seen in this figure, it is a data array that is transferred, that is the data from the whole loop that is transferred in a single transaction. This is clearly advantageous compared to transferring data for each pass in the loop. In particular, by parallelizing at a coarse granularity, the need for low latency, high throughput communication mechanisms such as those used in prior art finer granularity devices are reduced.

Furthermore, parallelizing at a significantly coarser granularity also allows the duplication of more control code between threads which reduces and simplifies inter-thread communication allowing the generation of distributed schedules. That is, we can distribute the control code across multiple processors both by putting each control thread on a different processor and by putting different parts of a single control thread onto different processors.

The transfer of data may be done by, writing the data to a particular buffer such as a FIFO. Alternatively it may simply be done by providing the other section of the program with information as to where the data has been stored.

The way of transferring the data depends on the system the program is executing on. In particular, if the architecture does not have shared memory, it is necessary to insert DMA copies from a buffer in one memory to a buffer in a different memory. This can lead to a lot of changes in the code: declaring both buffers, performing the copy, etc. In embodiments of the invention an analysis is performed to determine which buffers need to be replicated in multiple memory regions and to determine exactly which form of copy should be used. DMA copies are also inserted automatically subject to some heuristics when the benefit from having the programmer make the decision themselves is too small.

Systems with multiple local memories often have tight memory requirements which are exacerbated by allocating a copy of a buffer in multiple memories. The analysis takes account of this and seeks to reduce the memory requirement by overlapping buffers in a single memory when they are never simultaneously live.

It should be noted that although in some programs it may be appropriate to provide a FIFO type data store between the sections, in others it may be that the section requiring the data does not require it in a particular order, or it may not require all of the data. This can be provided for by varying the way the data is passed between the sections.

FIG. 16a shows a simple computer program annotated according to an embodiment of the present invention. An analysis of this program is performed initially and parts of the program are identified by programmer annotation in this embodiment although it could be identified by some other analysis including static analysis, profile driven feedback, etc. The parts identified are as follows:

What can be regarded as the "decoupling scope". This is a contiguous sequence of code that we wish to split into multiple threads.

The "replicatable objects": that is variables and operations which it is acceptable to replicate. A simple rule of thumb is that scalar variables (i.e., not arrays) which are not used outside the scope, scalar operations which only depend on and only modify replicatable variables, and control flow operations should be replicated but more sophisticated policies are possible.

Ordering dependencies between different operations: if two function calls both modify a non-replicated variable, the order of those two function calls is preserved in the decoupled code. (Extensions to the basic algorithm allow this requirement to be relaxed in various ways.)

The "data boundaries" between threads: that is, the non-replicatable variables which will become FIFO channels. (The "copies" data annotation described above determines the number of entries in the FIFO.)

This degree of annotation is fine for examples but would be excessive in practice so most real embodiments would rely on tools to add the annotations automatically based on heuristics and/or analyses.

At a high level, the algorithm splits the operations in the scope into a number of threads whose execution will produce the same result as the original program under any scheduling policy that respects the FIFO access ordering of the channels used to communicate between threads.

The particular decoupling algorithm used generates a maximal set of threads such that the following properties hold:

All threads have the same control flow structure and may have copies of the replicatable variables and operations.
Each non-replicatable operation is included in only one of the threads.
Each non-replicatable variable must satisfy one of the following:
   The only accesses to the variable in the original program are reads; or
   All reads and writes to the variable are in a single thread; or
   The variable was marked as a data boundary and all reads are in one thread and all writes are in another thread.
If two operations have an ordering dependency between them which is not due to a read after write (RAW) dependency on a variable which has been marked as a data boundary, then the operations must be in the same thread.

FIG. 16b shows the maximal set of threads for the program of FIG. 16a. One way to generate the set of threads shown in FIG. 16b is as follows:

1. For each non-replicatable operation, create a 'proto-thread' consisting of just that operation plus a copy of all the replicatable operations and variables. Each replicatable variable must be initialized at the start of each thread with the value of the original variable before entering the scope and one of the copies of each replicatable variable should be copied back into the master copy on leaving the scope. (Executing all these proto-threads is highly unlikely to give the same answer as the original program, because it lacks the necessary synchronization between threads. This is fixed by the next steps.)
2. Repeatedly pick two threads and merge them into a single thread if any of the following problems exist:
   a. One thread writes a non-replicatable variable which is accessed (read or written) by the other thread and the variable is not marked as a data boundary.
   b. Two threads both write to a variable which is marked as a data boundary.
   c. Two threads both read from a variable that is marked as a data boundary.
   d. There is an ordering dependency between an operation in one thread and an operation in the other thread which is not a RAW dependency on a variable marked as a data boundary.
3. When no more threads can be merged, quit Another way is to pick an operation, identify all the operations which must be in the same thread as that operation by repeatedly adding operations which would be merged (in step 2 above). Then pick the next operation not yet assigned to a thread and add all operations which must be in the same thread as that operation. Repeat until there are no more non-replicatable operations. It should be noted that this is just one possible way of tackling this problem: basically, we are forming equivalence classes based on a partial order and there are many other known ways to do this.

The above method splits a program into a number of sections which can be executed in parallel. There are many possible mechanisms that can be used to accomplish this task.

FIG. 17 schematically illustrates an asymmetric multiprocessor apparatus comprising a first execution mechanism 100 and a second execution mechanism 102. An asymmetric memory hierarchy within the system comprises a cache memory 104 connected to the first execution mechanism 100 and a shared memory 106 connected to both the first execution mechanism 100 and the second execution mechanism 102 via the cache memory 104. It will be appreciated that FIG. 17 illustrates a highly simplified system, but this is nevertheless asymmetric, contains an asymmetric memory hierarchy and would represent some level of difficulty in deciding which sections of a source program should execute on which execution mechanism 100, 102 and how the data should be partitioned between the different elements of the memory hierarchy 104, 106 (e.g. which data items used by the first processor 100 should be made cacheable and which non-cacheable).

FIG. 18 schematically illustrates an at least partial architectural description of the system of FIG. 17. This partial architectural description is in the style of the Spirit format and specifies which components are present and the interconnections between those components. It will be appreciated that in practice a Spirit architectural description will typically contain considerably more detail and information concerning the nature and interconnections of the various elements within the system. Nevertheless, this basic information as to which elements are present and how they are connected is used by a computer implemented method for transforming a source computer program into a transformed computer program for distributed execution on the system of FIG. 17.

FIG. 19 gives an example of a communication requirement which can be identified within a source computer program. This communication requirement is a Move instruction. This Move instruction is moving a variable A being manipulated within the first execution mechanism 100 (PE0) to the second execution mechanism 102 (PE1). Having identified this communication requirement, the architectural description of the system as given in FIG. 18 can be used to identify that an appropriate set of communication supporting operations need to be added to the code and include those illustrated, i.e. forming a MemoryBarrier on PE0, cleaning the variable A from the cache of PE0 and then loading the variable A from the memory 106 into the processor PE1. This is a considerably simplified example, but nevertheless illustrates the identification of a communication requirement followed by the associated communication support.

FIG. 20 schematically illustrates a section of source computer program including data placement tags and processing placement tags of the type described elsewhere herein. In particular, in respect of the data element char x[1000], a data placement tag is associated with the source computer program (in this particular example added to it) indicating that this data element should be stored within a memory MEM1. This information is used by the computer implemented method which maps portions of the source code to different execution mechanisms and compiles or configures those portions appropriately.

Also illustrated in FIG. 20 are two programming functions foo(x) and bar(x). It will be appreciated that these functions may represent complex sequences of instructions in their own right. The processing placement tags associated with each of these functions indicates where that function is to be executed. As an example, the function foo could be a general purpose control function and this is most appropriately performed using a general purpose processor PE0. Conversely the function bar may be a highly specialised FFT task or other specific function for which there is provided a specific accelerator in the form of the execution mechanism PE1 and accordingly it is appropriate to specify that this function should be executed on that particular execution mechanism.

1. Introduction

The following describes language extensions/annotations, compilation tools, analysis tools, debug/profiling tools, runtime libraries and visualization tools to help programmers program complex multiprocessor systems. It is primarily aimed at programming complex SoCs which contain heterogeneous parallelism (CPUs, DEs, DSPs, programmable accelerators, fixed-function accelerators and DMA engines) and irregular memory hierarchies.

The compilation tools can take a program that is either sequential or contains few threads and map it onto the available hardware, introducing parallelism in the process. When the program is executed, we can exploit the fact that we know mappings between the user's program and what is executing to efficiently present a debug and profile experience close to what the programmer expects while still giving the benefit of using the parallel hardware. We can also exploit the high level view of the overall system to test the system more thoroughly, or to abstract away details that do not matter for some views of the system.

This provides a way of providing a full view for SoC programming.

2. Single View Compilation 2.1 Overview

The task of programming a SoC is to map different parts of an application onto different parts of the hardware. In particular, blocks of code must be mapped onto processors, data engines, accelerators, etc. and data must be mapped onto various memories. In a heterogeneous system, we may need to write several versions of each kernel (each optimized for a different processor) and some blocks of code may be implemented by a fixed-function accelerator with the same semantics as the code.

The mapping process is both tedious and error-prone because the mappings must be consistent with each other and with the capabilities of the hardware. We reduce these problems using program analysis which:

detect errors in the mapping infer what mappings would be legal choose legal mappings automatically subject to some heuristics The number of legal mappings is usually large but once the programmer has made a few choices, the number of legal options usually drops significantly so it is feasible to ask the programmer to make a few key choices and then have the tool fill in the less obvious choices automatically.

Often the code needs minor changes to allow some mappings. In particular, if the architecture does not have shared memory, it is necessary to insert DMA copies from a buffer in one memory to a buffer in a different memory buffer. This leads to a lot of changes in the code: declaring both buffers, performing the copy, etc. Our compiler performs an analysis to determine which buffers need to be replicated in multiple memory regions and to determine exactly which form of copy should be used. It also inserts DMA copies automatically subject to some heuristics when the benefit from having the programmer make the decision themselves is too small.

Systems with multiple local memories often have tight memory requirements which are exacerbated by allocating a copy of a buffer in multiple memories. Our compiler uses lifetime analysis and heuristics to reduce the memory requirement by overlapping buffers in a single memory when they are never simultaneously live.

Programmable accelerators may have limited program memory so it is desirable to upload new code while old code is running. For correctness, we must guarantee that the new code is uploaded (and I-caches made consistent) before we start running it. Our compiler uses program analysis to check this and/or to schedule uploading of code at appropriate places.

For applications with highly variable load, it is desirable to have multiple mappings of an application and to switch dynamically between different mappings.

Some features of our approach are:

Using an architecture description to derive the 'rules' for what code can execute where. In particular, we use the type of each processor and the memories attached to each processor.

The use of program analysis together with the architecture description to detect inconsistent mappings.

Using our ability to detect inconsistent mappings to narrow down the list of consistent mappings to reduce the number of (redundant) decisions that the programmer has to make.

Selecting an appropriate copy of a buffer according to which processor is using it and inserting appropriate DMA copy operations.

Use of lifetime analyses and heuristics to reduce memory usage due to having multiple copies of a buffer.

Dynamic switching of mappings.

2.2 Annotations to Specify Mappings

To describe this idea further, we need some syntax for annotations. Here we provide one embodiment of annotations which provide the semantics we want.

In this document, all annotations take the form:

. . . @ {tag1=>value1, . . . tagm=>value}

Or, when there is just one tag and it is obvious,

. . . @ value

The primary annotations are on data and on code. If a tag is repeated, it indicates alternative mappings.

The tags associated with data include:
- {memory=>"bank3"} specifies which region of memory a variable is declared in.
- {copies=>2} specifies that a variable is double buffered
- {processor=>"P1"} specifies that a variable is in a region of memory accessible by processor P1.

For example, the annotation:
    int x[100] @ {memory=>"bank3", copies=>2, memory=>"bank4", copies=>1}
indicates that there are 3 alternative mappings of the array x: two in memory bank3 and one in memory bank4.

The tags associated with code include:
- {processor=>"P1"} specifies which processor the code is to run on
- {priority=>5} specifies the priority with which that code should run relative to other code running on the same processor
- {atomic=>true} specifies that the code is to run without pre-emption.
- {runtime=>"<=10 ms"} specifies that the code must be able to run in less than 10 milliseconds on that processor. This is one method used to guide automatic system mapping.

For example, the annotation:
    {fir(x); fft(x,y);} @ {processor=>"P1"}
Specifies that processor P1 is to execute fft followed by P1. The semantics is similar to that of a synchronous remote procedure call: when control reaches this code, free variables are marshalled and sent to processor P1, processor P1 starts executing the code and the program continues when the code finishes executing.

It is not always desirable to have synchronous RPC behaviour. It is possible to implement asynchronous RPCs using this primitive either by executing mapped code in a separate thread or by splitting each call into two parts: one which signals the start and one which signals completion.

The tags associated with functions are:
- {cpu=>"AR1DE"} specifies that this version of an algorithm can be run on a processor/accelerator of type "AR1DE"
- {flags=>"-O3"} specifies compiler options that should be used when compiling this function
- {implements=>"fir"} specifies that this version of an algorithm can be used as a drop in replacement for another function in the system For example, the annotation
    Void copy_DMA(void* src, void* tgt, unsigned length) @ {cpu=>"PL081", implements=>"copy"};
Specifies that this function runs on a PL081 accelerator (a DMA Primesys engine) and can be used whenever a call to "copy" is mapped to a PL081 accelerator.

2.3 Extracting Architectural Rules from the Architectural Description

There are a variety of languages for describing hardware architectures including the SPIRIT language and ARM SoCDesigner's internal language. While the languages differ in syntax, they share the property that we can extract information such as the following:
- The address mapping of each processor. That is, which elements of each memory region and which peripheral device registers are accessed at each address in the address and I/O space. A special case of this is being able to detect that a component cannot address a particular memory region at all.
- The type of each component including any particular attributes such as cache size or type.
- That a processor's load-store unit, a bus, a combination of buses in parallel with each other, a memory controller or the address mapping makes it possible for accesses to two addresses that map to the same component or to different components from one processor to be seen in a different order by another processor. That is, the processors are not sequentially consistent with respect to some memory accesses.
- That a combination of load-store units, caches, buffers in buses, memory controllers, etc. makes it possible for writes by one processor to the same memory location to suffer from coherency problems wrt another processor for certain address ranges.

Thus, from the architecture, we can detect both address maps which can be used to fill in fine details of the mapping process and we can detect problems such as connectivity, sequential consistency and incoherence that can affect the correctness of a mapping.

2.4 Detecting Errors in a System Mapping

Based on rules detected in an architectural description and/or rules from other sources, we can analyse both sequential and parallel programs to detect errors in the mapping. Some examples:
- If a piece of code is mapped to a processor P and that code reads or writes data mapped to a memory M and P cannot access M, then there is an error in the mapping.
- If two pieces of code mapped to processors P1 and P2 both access the same variable x (e.g. P1 writes to x and P2 reads from x), then any write by P1 that can be observed by a read by P2 must:
  - have some synchronization between P1 and P2
  - be coherent (e.g., there may need to be a cache flush by P1 before the synchronization and a cache invalidate by P2 after the synchronization)
  - be sequentially consistent (e.g., there may need to be a memory barrier by P1 before the synchronization and a memory barrier by P2 after the synchronization)
  - share memory (e.g., it may be necessary to insert one or more copy operations (by DMA engines or by other processors/accelerators) to transfer the data from one copy of x to the other.
- Synchronization and signalling can be checked
- Timing and bandwidth can be checked
- Processor capability can be checked: a DMA engine probably cannot play Pacman
- Processor speed can be checked: a processor may not be fast enough to meet certain deadlines.
- Etc.

Thus, we can check the mapping of a software system against the hardware system it is to run on based on a specification of the architecture or additional information obtained in different ways.

2.5 Filling in Details and Correcting Errors in a System Mapping

Having detected errors in a system mapping, there are a variety of responses. An error such as mapping a piece of code to a fixed-function accelerator that does not support that function should probably just be reported as an error that the programmer must fix. Errors such as omitting synchronization can sometimes be fixed by automatically inserting synchronization. Errors such as requiring more variables to a memory bank than will fit can be solved, to some extent, using overlay techniques. Errors such as mapping an overly large variable to a memory can be resolved using software managed paging though this may need hardware support or require that the kernel be compiled with software paging turned on (note: software paging is fairly unusual so we have to implement it before we can turn it on!). Errors such as omitting memory barriers, cache flush/invalidate operations or DMA transfers can always be fixed automatically though it can require heuristics to insert them efficiently and, in some cases, it is more appropriate to request that the programmer fix the problem themselves.

3 Architecture Driven Communication 3.1 Overview

Given a program that has been mapped to the hardware, the precise way that the code is compiled depends on details of the hardware architecture. In particular, it depends on whether two communicating processors have a coherent and sequentially consistent view of a memory through which they are passing data.

3.2 Communication Glue Code

Our compiler uses information about the SoC architecture, extracted from the architecture description, to determine how to implement the communication requirements specified within the program. This enables it to generate the glue code necessary for communication to occur efficiently and correctly. This can include generation of memory barriers, cache maintenance operations, DMA transfers and synchronisation on different processing elements.

This automation reduces programming complexity, increases reliability and flexibility, and provides a useful mechanism for extended debugging options.

3.3 Communication Error Checking

Other manual and automatic factors may be used to influence the communication mechanism decisions. Errors and warnings within communication mappings can be found using information derived from the architecture description.

3.4 Summary

Some features of our approach are:
  Detecting coherence and consistency problems of communication requirements from a hardware description.
  Automatically inserting memory barriers, cache maintenance, DMA transfers etc. to fix coherence/consistency problems into remote procedure call stubs (i.e., the "glue code") based on above.

4. Accelerator RPC

We take the concept of Remote Procedure Calls (RPCs) which are familiar on fully programmable processors communicating over a network, and adapt and develop it for application in the context of a SoC: processors communicating over a bus with fixed function, programmable accelerators and data engines.

Expressing execution of code on other processing elements or invocation of accelerators as RPCs gives a function based model for programmers, separating the function from the execution mechanism. This enables greater flexibility and scope for automation and optimisation.

4.1 RPC Abstraction

An RPC abstraction can be expressed as functions mapped to particular execution mechanisms:

```
main( ) {
    foo( );
    foo( ) @ {processor => p2};
}
```

This provides a simple mechanism to express invocation of functions, and the associated resourcing, communication and synchronisation requirements.

Code can be translated to target the selected processing elements, providing the associated synchronisation and communication. For example, this could include checking the resource is free, configuring it, starting it and copying the results on completion. The compiler can select appropriate glue mechanisms based on the source and target of the function call. For example, an accelerator is likely to be invoked primarily by glue on a processor using a mechanism specific to the accelerator.

The glue code may be generated automatically based on a high level description of the accelerator or the programmer may write one or more pieces of glue by hand.

The choice of processor on which the operation runs can be determined statically or can be determined dynamically. For example, if there are two identical DMA engines, one might indicate that the operation can be mapped onto either engine depending on which is available first.

The compiler optimisations based on the desired RPC interface can range from a dynamically linked interface to inter-procedural specialisation of the particular RPC interface.

4.2 RPC Semantics

RPC calls may be synchronous or asynchronous. Asynchronous calls naturally introduce parallelism, while synchronous calls are useful as a simpler function call model, and may be used in conjunction with fork-join parallelism. In fact, parallelism is not necessary for efficiency; a synchronous call alone can get the majority of the gain when targeting accelerators. Manually and automatically selecting between asynchronous and synchronous options can benefit debugging, tracing and optimisation.

RPC calls may be re-entrant or non-reentrant, and these decisions can be made implicitly, explicitly or through program analysis to provide benefit such as optimisation where appropriate.

4.3 RPC Debugging

This mechanism enables a particular function to have a number of different execution targets within a program, but each of those targets can be associated back to the original function; debugging and trace can exploit this information. This enables a user to set a breakpoint on a particular function, and the debug and trace mechanisms be arranged such that it can be caught wherever it executes, or on a restricted subset (e.g. a particular processing element). The details of the RPC interface implementation can be abstracted away in some debugging views.

4.4 Summary

Some features of our approach are:
  Using an RPC-like approach for mapping functions on to programmable and fixed function accelerators, including multiple variants.
  Providing mechanisms for directing mapping and generation of the marshalling and synchronisation to achieve it.
  Optimising the RPC code based on inter-procedural and program analysis.
  Providing debug functionality based on information from the RPC abstraction and the final function implementations.

5. Coarse-Grained Dataflow 5.1 Overview

Increasingly, applications are being built using libraries which define datatypes and a set of operations on those types. The datatypes are often bulk datastructures such as arrays of data, multimedia data, signal processing data, network packets, etc. and the operations may be executed with some degree of parallelism on a coprocessor, DSP processor, accelerator, etc. It is therefore possible to view programs as a series of often quite coarse-grained operations applied to quite large data structures instead of the conventional view of a program as a sequence of 'scalar' operations (like '32 bit add') applied to 'scalar' values like 32-bit integers or the small sets of values found in SIMD within a register (SWAR) processing such as that found in NEON. It is also advantageous to do so because this coarse-grained view can be a good match for accelerators found in modern SoCs.

We observe that with some non-trivial adaptation and some additional observations, optimization techniques known to work on fine-grained operations and data can be adapted to operate on coarse-grained operations and data.

Our compiler understands the semantics associated with the data structures and their use within the system, and can manipulate them and the program to perform transformations and optimisations to enable and optimise execution of the program.

5.2 Conventional Analyses and their Extension

Most optimizing compilers perform a dataflow analysis prior to optimization. For example, section 10.5 of Aho Sethi and Ullman's 'Compilers: Principles Techniques and Tools', published by Addison Wesley, 1986, ISBN: 0-201-10194-7 describes dataflow analysis. The dataflow analysis is restricted to scalar values: those that fit in a single CPU register. Two parts of a dataflow analysis are:

identifying the dataflow through individual operations
combining the dataflow analysis with a control-flow analysis to determine the dataflow from one program point to another.

In order to use dataflow analysis techniques with coarse-grained dataflow, we modify the first part so that instead of identifying the effect of a single instruction on a single element, we identify the effect of a coarse-grained operation (e.g., a function call or coprocessor invocation) on an entire data structure in terms of whether the operation is a 'use', a 'def' or a 'kill' of the value in a data structure. Care must be taken if an operation modifies only half of an array since the operation does not completely kill the value of the array.

For operations implemented in hardware or in software, this might be generated automatically from a precise description of the operation (including the implementation of the operation) or it might be generated from an approximate description of the main effects of the operation or it might be provided as a direct annotation.

In particular, for software, these coarse-grained operations often consist of a simple combination of nested loops and we can analyze the code to show that the operation writes to an entire array and therefore 'kills' the old value in the array. In scalar analysis, this is trivial since any write necessarily kills the entire old value.

The following sections identify some of the uses of coarse-grained dataflow analysis 5.3 Multiple Versions of the Same Buffer Especially when writing parallel programs or when using I/O devices and when dealing with complex memory hierarchies, it is necessary to allocate multiple identically sized buffers and copy between the different buffers (or use memory remapping hardware to achieve the effect of a copy). We propose that in many cases these multiple buffers can be viewed as alternative versions of a single, logical variable. It is possible to detect this situation in a program with multiple buffers, or the programmer can identify the situation. One way the programmer can identify the situation is to declare a single variable and then use annotations to specify that the variable lives in multiple places or the programmer could declare multiple variables and use annotations to specify that they are the same logical variable.

However the different buffers are identified as being one logical variable, the advantages that can be obtained include:

more intelligent buffer allocation detecting errors where one version is updated and that change is not propagated to other version before it is used debug, trace and profile tools can treat a variable as one logical entity so that, for example, if programmer sets watchpoint on x then tools watch for changes on any version of x. Likewise, if compiler has put x and y in the same memory location (following liveness analysis), then the programmer will only be informed about a write to x when that memory location is being used to store x, not when it is being used to store y. When doing this, you might well want to omit writes to a variable which exist only to preserve the multi-version illusion. For example, if one accelerator writes to version 1, then a dma copies version 1 to version 2, then another accelerator modifies the variable, then the programmer will often not be interested in the dma copy.

We note that compilers do something similar for scalar variables: the value of a scalar variable 'x' might sometimes live on the stack, sometimes in register 3, sometimes in register 6, etc. and the compiler keeps track of which copies currently contain the live value.

5.4 Allocation

By performing a liveness analysis of the data structures, the compiler can provide improved memory allocation through memory reuse because it can identify opportunities to place two different variables in the same memory location. Indeed, one can use many algorithms normally used for register allocation (where the registers contain scalar values) to perform allocation of data structures. One modification required is that one must handle the varying size of buffers whereas, typically, all scalar registers are the same size.

5.5 Scheduling

One thing that can increase memory use is having many variables simultaneously live. It has been known for a long time that you can reduce the number of scalar registers required by a piece of code by reordering the scalar operations so that less variables are simultaneously live. Using a coarse-grained dataflow analysis, one can identify the lifetime of each coarse-grained data structure and then reorder code to reduce the number of simultaneously live variables. One can even choose to recalculate the value of some data structure because it is cheaper to recalculate it than to remember its value.

When parallelising programs, one can also deliberately choose to restrain the degree of parallelism to reduce the number of simultaneously live values. Various ways to restrain the parallelism exist: forcing two operations into the same thread, using mutexes/semaphores to block one thread if another is using a lot of resource, tweaking priorities or other scheduler parameters.

If a processor/accelerator has a limited amount of available memory, performing a context switch on that processor can be challenging. Context switching memory-allocated variables used by that processor solves the problem.

5.6 Optimisation

Compiler books list many other standard transformations that can be performed to scalar code. Some of the mapping and optimisation techniques that can be applied at the coarse-grain we discuss include value splitting, spilling, coalescing, dead variable removal, recomputation, loop hoisting and CSE.

Data structures will be passed as arguments, possibly as part of an ABI. Optimisations such as specialisation and not conforming to the ABI when it is not exposed can be applied.

5.7 Multigranularity Operation

In some cases, one would want to view a complex datastructure at multiple granularities. For example, given a buffer of complex values, one might wish to reason about dataflow affecting all real values in the buffer, dataflow affecting all imaginary values or dataflow involving the whole buffer. (More complex examples exist)

5.8 Debugging

When debugging, it is possible for the data structure to live in a number of different places throughout the program. We can provide a single debug view of all copies, and watch a value wherever it is throughout the lifetime of a program, optionally omitting omit certain accesses such as DMAs.

The same is possible for tracing data structures within the system.

5.9 Zero Copying

Using this coarse-grained view, one can achieve zero copy optimization of a sequence of code like this:

```
int x[100];
generate(&x); // writes to x
put(channel,&x)
``` by inlining the definition of put to get:

```
int x[100];
generate(&x); // writes to x
int *px=put_begin(channel);
copy(px,&x);
put_end(channel,px);
``` then reordering the code a little:

```
int *px=put_begin(channel);
int x[100];
generate(&x); // writes to x
copy(px,&x);
put_end(channel,px);
``` and optimizing the memory allocation and copy:

```
int *px=put_begin(channel);
generate(px); // writes to *px
put_end(channel,px);
```

5.10 Trace

Most of this section is about coarse-grained data structure but some benefits from identifying coarse-grained operations come when we are generating trace. Instead of tracing every scalar operation that is used inside a coarse-grained operation, we can instead just trace the start and stop of the operation. This can also be used for cross-triggering the start/stop of recording other information through trace.

Likewise, instead of tracing the input to/output from the whole sequence of scalar operations, we can trace just the values at the start/end of the operation.

5.11 Validating Programmer Assertions

If we rely on programmer assertions, documentation, etc. in performing our dataflow analysis, it is possible that an error in the assertions will lead to an error in the analysis or transformations performed. To guard against these we can often use hardware or software check mechanisms. For example, if we believe that a function should be read but not written by a given function, then we can perform a compile-time analysis to verify it ahead of time or we can program an MMU or MPU to watch for writes to that range of addresses or we can insert instrumentation to check for such errors. We can also perform a 'lint' check which looks for things which may be wrong even if it cannot prove that they are wrong. Indeed, one kind of warning is that the program is too complex for automatica analysis to prove that it is correct.

5.12 Summary

Some of the features of our approach are:

Using a register like (aka scalar-like) approach to data structure semantics within the system Using liveness analysis to influence memory allocation, parallelism and scheduling decisions.

Applying register optimisations found in compiler to data structures within a program.

Providing debugging and tracing of variables as a single view

6. Decoupling

6.1 Overview

Given a program that uses some accelerators, it is possible to make it run faster by executing different parts in parallel with one another. Many methods for parallelizing programs exist but many of them require homogeneous hardware to work and/or require very low cost, low latency communication mechanisms to obtain any benefit. Our compiler uses programmer annotations (many/all of which can be inserted automatically) to split the code that invokes the accelerators ('the control code') into a number of parallel "threads" which communicate infrequently. Parallelizing the control code is advantage because it allows tasks on independent accelerators to run concurrently.

Our compiler supports a variety of code generation strategies which allow the parallelized control code to run on a control processor in a real time operating system, in interrupt handlers or in a polling loop (using 'wait for event' if available to reduce power) and it also supports distributed scheduling where some control code runs on one or more control processors, some control code runs on programmable accelerators, some simple parts of the code are implemented using conventional task-chaining hardware mechanisms. It is also possible to design special 'scheduler devices' which could execute some parts of the control code. The advantage of not running all the control code on the control processor is that it can greatly decrease the load on the control processor.

Other parallelising methods may be used in conjunction with the other aspects of this compiler.

Some of the features of our approach are:

By applying decoupled software pipelining to the task of parallelizing the control code in a system that uses heterogeneous accelerators, we significantly extend the reach of decoupled software pipelining and by working on coarser grained units of parallelism, we avoid the need to add hardware to support high frequency streaming.

By parallelizing at a significantly coarser granularity, we avoid the need for low latency, high throughput communication mechanisms used in prior art.

Parallelizing at a significantly coarser granularity also allows us to duplicate more control code between threads which reduces and simplifies inter-thread communication which allows us to generate distributed schedules. That is, we can distribute the control code across multiple processors both by putting each control thread on a different processor and by putting different parts of a single control thread onto different processors.

By optionally allowing the programmer more control over the communication between threads, we are able to overcome the restriction of decoupled software pipelining to acyclic 'pipelines'.

The wide range of backends including distributed scheduling and use of hardware support for scheduling.

Our decoupling algorithm is applied at the source code level whereas existing decoupling algorithms are applied at the assembly code level after instruction scheduling.

Some of the recent known discussions on decoupled software pipelining are:

- Decoupled Software Pipelining: http://liberty.princeton.edu/Research/DSWP/
  http://liberty.princeton.edu/Publications/index.php?abs=1&setselect=pact04_dswp
  http://liberty.cs.princeton.edu/Publications/index.php?abs=1&setselect=micro38_dswp
- Automatically partitioning packet processing applications for pipelined architectures, PLDI 2005, ACM http://portal.acm.org/citation.cfm?id=1065010.1065039

6.2 A Basic Decoupling Algorithm

The basic decoupling algorithm splits a block of code into a number of threads that pass data between each other via FIFO channels. The algorithm requires us to identify (by programmer annotation or by some other analysis including static analysis, profile driven feedback, etc.) the following parts of the program:

- The "decoupling scope": that is a contiguous sequence of code that we wish to split into multiple threads. Some ways this can be done are by marking a compound statement, or we can insert a 'barrier' annotation that indicates that some parallelism ends/starts here.
- The "replicatable objects": that is variables and operations which it is acceptable to replicate. A simple rule of thumb is that scalar variables (i.e., not arrays) which are not used outside the scope, scalar operations which only depend on and only modify replicatable variables, and control flow operations should be replicated but more sophisticated policies are possible.
- Ordering dependencies between different operations: if two function calls both modify a non-replicated variable, the order of those two function calls is preserved in the decoupled code. (Extensions to the basic algorithm allow this requirement to be relaxed in various ways.)
- The "data boundaries" between threads: that is, the non-replicatable variables which will become FIFO channels. (The "copies" data annotation described above determines the number of entries in the FIFO.)

(Identifying replicatable objects and data boundaries are two of the features of our decoupling algorithm.)

If we use annotations on the program to identify these program parts, a simple program might look like this:

```
void main( ) {
    int i;
    for(i=0; i<10; ++i) {
        int x[100] @ {copies=2, replicatable=false; boundary=true} ;
        produce(x) @ {replicatable=false, writes_to=[x]};
            DECOUPLE(x);
        consume(x) @ {replicatable=false, reads_from=[x]};
    }
}
```

This degree of annotation is fine for examples but would be excessive in practice so most real embodiments would rely on tools to add the annotations automatically based on heuristics and/or analyses.

At a high level, the algorithm splits the operations in the scope into a number of threads whose execution will produce the same result as the original program under any scheduling policy that respects the FIFO access ordering of the channels used to communicate between threads.

The particular decoupling algorithm we use generates a maximal set of threads such that the following properties hold:

All threads have the same control flow structure and may have copies of the replicatable variables and operations.

Each non-replicatable operation is included in only one of the threads.

Each non-replicatable variable must satisfy one of the following:
- The only accesses to the variable in the original program are reads; or
- All reads and writes to the variable are in a single thread; or
- The variable was marked as a data boundary and all reads are in one thread and all writes are in another thread.

If two operations have an ordering dependency between them which is not due to a read after write (RAW) dependency on a variable which has been marked as a data boundary, then the operations must be in the same thread.

For the example program above, the maximal set of threads is:

```
void main( ) {
    int x[100] @ {copies=2};
    channel c @ {buffers=x};
    parallel sections{
        section{
            int i;
            for(i=0; i<10; ++i) {
                int x1[100];
                produce(x1);
                put(c,x1);
            }
        }
        section{
            int i;
            for(i=0; i<10; ++i) {
                int x2[100];
                get(c,x2);
                consume(x2);
            }
        }
    }
}
```

One way to generate this set of threads is as follows:

4. For each non-replicatable operation, create a 'proto-thread' consisting of just that operation plus a copy of all the replicatable operations and variables. Each replicatable variable must be initialized at the start of each thread with the value of the original variable before entering the scope and one of the copies of each replicatable variable should be copied back into the master copy on leaving the scope. (Executing all these proto-threads is highly unlikely to give the same answer as the original program, because it lacks the necessary synchronization between threads. This is fixed by the next steps.)

5. Repeatedly pick two threads and merge them into a single thread if any of the following problems exist:
   a. One thread writes a non-replicatable variable which is accessed (read or written) by the other thread and the variable is not marked as a data boundary.
   b. Two threads both write to a variable which is marked as a data boundary.
   c. Two threads both read from a variable that is marked as a data boundary.
   d. There is an ordering dependency between an operation in one thread and an operation in the other thread which is not a RAW dependency on a variable marked as a data boundary.

6. When no more threads can be merged, quit

Another way if to pick an operation, identify all the operations which must be in the same thread as that operation by repeatedly adding operations which would be merged (in step 2 above). Then pick the next operation not yet assigned to a thread and add all operations which must be in the same thread as that operation. Repeat until there are no more non-replicatable operations. (There are lots of other ways of tackling this problem: basically, we are forming equivalence classes based on a partial order and there are many known ways to do that.)

Note that doing dataflow analysis on arrays one must distinguish defs which are also kills (i.e., the entire value of a variable is overwritten by an operation) and that requires a more advanced analysis than is normally used.

6.3 Decoupling Extensions

There are a number of extensions to this model

6.3.1 Range Splitting Preprocessing

It is conventional to use dataflow analysis to determine the live ranges of a scalar variable and then replace the variable with multiple copies of the variable: one for each live range. We use the same analysis techniques to determine the live range of arrays and split their live ranges in the same way. This has the benefit of increasing the precision of later analyses which can enable more threads to be generated. On some compilers it also has the undesirable effect of increasing memory usage which can be mitigated by later merging these copies if they end up in the same thread and by being selective about splitting live ranges where the additional decoupling has little overall effect on performance.

6.3.2 Zero Copy Optimizations

The put and get operations used when decoupling can be used both for scalar and non-scalar values (i.e., both for individual values (scalars) and arrays of values (non-scalars) but they are inefficient for large scalar values because they require a memory copy. Therefore, for coarse-grained decoupling, it is desirable to use an optimized mechanism to pass data between threads.

In operating systems, it is conventional to use "zero copy" interfaces for bulk data transfer: instead of generating data into one buffer and then copying the data to the final destination, we first determine the final destination and generate the data directly into the final destination. Applying this idea to the channel interface, we can replace the simple 'put' operation with two functions: put_begin obtains the address of the next free buffer in the channel and put_end makes this buffer available to readers of the channel:

Void* put_begin(channel *ch);
    Void put_end(channel *ch, void* buf);

Similarly, the get operation is split into a get_begin and get_end pair

Void* get_begin(channel *ch);
    Void get_end(channel *ch, void* buf);

Using these operations, we can often rewrite sequences of code such as:

Int x[100];
    Generate(x);
    Put(ch,x);

to this more efficient sequence:

Int *px=put_begin(ch);
    Generate(px);
    Put_end(ch,px);

And similarity, for get:

Int x[100];
    Get(ch,x);
    Consume(x);

to this more efficient sequence:

Int *px=get_begin(ch);
    Consume(px);
    get_end(ch,px);

Note that doing zero copy correctly requires us to take lifetime of variables into account. We can do that using queues with multiple readers, queues with intermediate r/w points, reference counts or by restricting the decoupling (all readers must be in same thread and . . . ) to make lifetime trivial to track. This can be done by generating custom queue structures to match the code or custom queues can be built out of a small set of primitives.

6.3.3 Dead Code and Data Elimination

This section illustrates both how to get better results and also that we may not get exactly the same control structure but that they are very similar.

6.3.4 Allowing Cyclic Thread Dependencies

Prior art on decoupling restricts the use of decoupling to cases where the communication between the different threads is acyclic. There are two reasons why prior art has done this:

2. Cyclic thread dependencies can lead to "Loss of Decoupling"—that is, two threads may not run in parallel because of data dependencies between them.

3. A particularity common case of cyclic thread dependencies is code such as

```
y = 1;
while(1) {
    x = f(y);
    y = g(x);
}
```

Under existing decoupling schemes, puts are always inserted after assignment to any data boundary variable. This would require both a put outside the loop and a put at the end of the loop:

```
y1 = 1;
put(ch,y1);
while(1) {
    y2 = get(ch);
    x = f(y2);
    y3 = g(x);
    put(ch,y3);
}
```

Existing decoupling schemes only generate matched pairs of puts and gets (i.e., there is only one put on each channel and only one get on each channel so they cannot generate such code An alternative way of decoupling this code is to generate:

```
y1 = 1;
while(1) {
    put(ch,y1);
    y2 = get(ch);
    x = f(y2);
    y1 = g(x);
}
```

This does have matched pairs of puts and gets but breaks the rule of always performing a put after any assignment to a variable so it is also not generated by existing decoupling techniques.

6.3.5 Exposing Channels to the Programmer

It is possible to modify the decoupling algorithm to allow the programmer to insert puts and gets (or put_begin/end, get_begin/end pairs) themselves. The modified decoupling algorithm treats the puts and gets in much the same way that the standard algorithm treats data boundaries. Specifically, it constructs the maximal set of threads such that:

- Almost all the same conditions as for standard algorithm go here
- All puts to a channel are in the same thread
- All gets to a channel are in the same thread For example, given this program:

```
channel ch1;
put(ch1,0);
for(int i=0; i<N; ++i) {
    int x = f( );
    put(ch1,x);
    int y = g(get(ch1));
    DECOUPLE(y);
    h(x,y);
}
```

The modified decoupling algorithm will produce:

```
channel ch1, ch2;
put(ch1,0);
parallel sections{
    section{
        for(int i=0; i<10; ++i) {
            x = f( );
            put(ch1,x);
            int y = get(ch2);
            h(x,y);
        }
    }
    section{
        for(int i=0; i<10; ++i) {
            int y = g(get(ch1));
            put(ch2,y);
        }
    }
}
```

This extension of decoupling is useful for creating additional parallelism because it allows f and g to be called in parallel. Writing code using explicit puts can also be performed as a preprocessing step. For example, we could transform:

```
for(i=0; i<N; ++i) {
    x = f(i);
    y = g(i,x);
    h(i,x,y);
}
```

To the following equivalent code:

```
x = f(0);
for(i=0: i<N; ++i) {
    y = g(i,x);
    h(i,x,y);
    if (i+1<N) x = f(i+1);
}
```

Which, when decoupled gives very similar code to the above. (There are numerous variations on this transformation including computing f(i+1) unconditionally, peeling the last iteration of the loop, etc.)

6.3.6 Alternatives to FIFO Channels

A First-In First-Out (FIFO) channel preserves the order of values that pass through it: the first value inserted is the first value extracted, the second value inserted is the second value extracted, etc. Other kinds of channel are possible including:

- a "stack" which has Last in First out (LIFO) semantics. Amongst other advantages, stacks can be simpler to implement
- a priority queue where entries are prioritized by the writer or according to some property of the entry and the reader always received the highest priority entry in the queue.
- a merging queue where a new value is not inserted if it matches the value at the back of the queue or as a variant, if it matches any value in the queue. Omitting duplicate values which may help reduce duplicated work
- a channel which only tracks the last value written to the queue. That is, the queue logically contains only the most recently written entry. This is useful if the value being passed is time-dependent (e.g., current temperature) and it is desirable to always use the most recent value. Note that with fine-grained decoupling the amount of time between generation of the value and its consumption is usually small so being up to date is not a problem; whereas in coarse-grained decoupling, a lot of time may pass between generation and consumption and the data could easily be out of date if passed using a FIFO structure.
- A channel which communicates with a hardware device. For example, a DMA device may communicate with a CPU using a memory mapped doubly-linked list of queue entries which identify buffers to be copied or a temperature sensor may communicate with a CPU using a device register which contains the current temperature.

Using most of these alternative channels has an affect on program meaning so we either have to perform an analysis before using a different kind of channel or the programmer can indicate that a different choice is appropriate/allowed.

6.3.7 Using Locks

In parallel programming, it is often necessary for one thread to need exclusive access to some resource while it is using that resource to avoid a class of timing dependent behaviour known as a "race condition" or just a "race". The regions of exclusive access are known as "critical sections" and are often clearly marked in a program. Exclusive access can be arranged in several ways. For example, one may 'acquire' (aka 'lock') a 'lock' (aka 'mutex') before starting to access the resource and 'release' (aka 'unlock') the lock after using the resource. Exclusive access may also be arranged by disabling pre-emption (such as interrupts) while in a critical section (i.e., a section in which exclusive access is required). In some circumstances, one might also use a 'lock free' mechanism where multiple users may use a resource but at some point during use (in particular, at the end), they will detect the conflict, clean up and retry.

Some examples of wanting exclusive access include having exclusive access to a hardware accelerator, exclusive access to a block of memory or exclusive access to an input/output device. Note that in these cases, it is usually not necessary to preserve the order of accesses to the resource.

The basic decoupling algorithm avoids introducing race conditions by preserving all ordering dependencies on statements that access non-replicated resources. Where locks have been inserted into the program, the basic decoupling algorithm is modified as follows:

The ordering dependencies on operations which use shared resources can be relaxed. This requires programmer annotation and/or program analysis which, for each operation which may be reordered, identifies:

Which other operations it can be reordered relative to
Which operations can simultaneously access the same resource (i.e., without requiring exclusive access)
Which critical section each operation occurs in.

For example, one might identify a hardware device as a resource, then indicate which operations read from the resource (and so can be executed in parallel with each other) and which operations modify the resource (and so must have exclusive access to the resource).

For simplicity, one might identify all operations inside a critical section as having an ordering dependency between them though one can sometimes relax this if the entire critical section lies inside the scope of decoupling.

One might determine which critical section each operation occurs in using an analysis which conservatively approximates the set of locks held at all points in the program.

6.3.8 Multithreaded Input

Decoupling can be applied to any sequential section of a parallel program. If the section communicates with the parallel program, we must determine any ordering dependencies that apply to operations within the section (a safe default is that the order of such operations should be preserved). What I'm saying here is that one of the nice properties of decoupling is that it interacts well with other forms of paralellization including manual parallelization.

6.4 Decoupling Backends

The decoupling algorithm generates sections of code that are suitable for execution on separate processors but can be executed on a variety of different execution engines by modifying the "back end" of the compiler. That is, by applying a further transformation to the code after decoupling to better match the hardware or the context we wish it to run in.

6.4.1 Multiprocessor and Multithreaded Processor Backends

The most straightforward execution model is to execute each separate section in the decoupled program on a separate processor or, on a processor that supports multiple hardware contexts (i.e., threads), to execute each separate section on a separate thread.

Since most programs have at least one sequential section before the separate sections start (e.g., there may be a sequential section to allocate and initialize channels), execution will typically start on one processor which will later synchronize with the other processors/threads to start parallel sections on them.

6.4.2 Using Accelerators

In the context of an embedded system and, especially, a System on Chip (SoC), some of the data processing may be performed by separate processors such as general purpose processors, digital signal processors (DSPs), graphics processing units (GPUs), direct memory access (DMA) units, data engines, programmable accelerators or fixed-function accelerators. This data processing can be modelled as a synchronous remote procedure call. For example, a memory copy operation on a DMA engine can be modelled as a function call to perform a memory copy. When such an operation executes, the thread will typically:

acquire a lock to ensure it has exclusive access to the DMA engine
configure the DMA engine with the source and destination addresses and the data size
start the DMA engine to initiate the copy
wait for the DMA engine to complete the copy which will be detected either by an interrupt to a control processor or by polling
copy out any result from the copy (such as a status value)
release the lock on the accelerator This mode of execution can be especially effective because one 'control processor' can keep a number of accelerator's busy with the control processor possibly doing little more than deciding which accelerator to start next and on what data. This mode of execution can be usefully combined with all of the following forms of execution.

6.4.3 RTOS Backend

Instead of a multiprocessor or multithreaded processor, one can use a thread library, operating system (OS) or real time operating system (RTOS) running on one or more processors to execute the threads introduced by decoupling. This is especially effective when combined with the use of accelerators because running an RTOS does not provide parallelism and hence does not increase performance but using accelerators does provide parallelism and can therefore increase performance.

6.4.4 Transforming to Event-Based Execution

Instead of executing threads directly using a thread library, OS or RTOS, one can transform threads into an 'event-based' form which can execute more efficiently than threads. The methods can be briefly summarized as follows:

Transformations to data representation.
The usual representation of threads allocates thread-local variables on a stack and requires one stack per thread. The overhead of managing this stack and some of the space overhead of stacks can be reduced by using a different allocation policy for thread-local variables based on how many copies of the variable can be live at once and on the lifetime of the variables.
If only one copy of each variable can be live at once (e.g., if the functions are not required to be re-entrant), then all variables can be allocated statically (i.e., not on a stack or heap). If multiple copies of a variable can be live at once (e.g., if more than once instance of a thread can be live at once), the variables can be allocated on the heap.

Transformations to context-switch mechanism
When one processor executes more threads than the processor supports, the processor must sometimes switch from executing one thread to executing another thread. This is known as a 'context switch'. The usual context mechanism used by threads is to save the values of all registers on the stack or in a reserved area of memory called the "thread control block", then load all the registers with values from a different thread control block and restart the thread. The advantage of this approach is that a context switch can be performed at almost any point during execution so any code can be made multi-threaded just by using a suitable thread library, OS or RTOS.

An alternative mechanism for context switching is to transform each thread to contain explicit context switch points where the thread saves its current context in a thread control block and returns to the scheduler which selects a new thread to run and starts it. The advantages of this approach are that thread control blocks can be made significantly smaller. If all context switches occur in the top-level function and all thread-local variables can be statically allocated, it is possible to completely eliminate the stack so that the entire context of a thread can be reduced to just the program counter value which makes context switches very cheap and makes thread control blocks extremely small. A further advantage of performing context switches only at explicit context switch points is that it is easier and faster to ensure that a resource shared between multiple threads is accessed exclusively by at most one thread at a time because, in many cases, it is possible to arrange that pre-emption only happens when the shared resource is not being used by the current thread.

Together, these transformations can be viewed as a way of transforming a thread into a state machine with each context switch point representing a state and the code that continues execution from each context switch point viewed as a transition function to determine the next state. Execution of transformed threads can be viewed as having been transformed to an event-based model where all execution occurs in response to external events such as responses from input/output devices or from accelerators.

It is not necessary to transform all threads: event-based execution can coexist with threaded execution.

6.4.5 Interrupt-Driven Execution

Transforming threads as described above to allow event-based execution is a good match for applications that use accelerators that signal task completion via interrupts. On receiving an interrupt signalling task completion the following steps occur:

the state of the associated accelerator is updated all threads that could be blocked waiting for that task to complete or for that accelerator to become available are executed. This may lead to further threads becoming unblocked.

When there are no runnable threads left, the interrupt handler completes 6.4.6 Polling-Based Execution Transforming threads as described above is also a good match for polling-based execution where the control processor tests for completion of tasks on a set of accelerators by reading a status register associated with each accelerator. This is essentially the same as interrupt-driven execution except that the state of the accelerators is updated by polling and the polling loop executes until all threads complete execution.

6.4.7 Distributed Scheduling

Distributed scheduling can be done in various ways. Some part of a program may be simple enough that it can be implemented using a simple state machine which schedules one invocation of an accelerator after completion of another accelerator. Or, a control processor can hand over execution of a section within a thread to another processor. In both cases, this can be viewed as a RPC like mechanism ("{foo( ); bar( )@P0;}@P1"). In the first case, one way to implement it is to first transform the thread to event-based form and then opportunistically spot that a sequence of system states can be mapped onto a simple state machine and/or you may perform transformations to make it map better.

6.4.8 Non-Work-Conserving Schedulers and Priorities/Deadlines

Two claims in this section: 1) using a priority mechanism and 2) using a non-work-conserving scheduler in the context of decoupling If a system has to meet a set of deadlines and the threads within the system share resources such as processors, it is common to use a priority mechanism to select which thread to run next. These priorities might be static or they may depend on dynamic properties such as the time until the next deadline or how fill/empty input and output queues are.

In a multiprocessor system, using a priority mechanism can be problematic because at the instant that one task completes, the set of tasks available to run next is too small to make a meaningful choice and better schedules occur if one waits a small period of time before making a choice. Such schedulers are known as non-work-conserving schedulers.

7. Trace Reconstruction 7.1 Overview

A long-standing problem of parallelizing compilers is that it is hard to relate the view of execution seen by debug mechanisms to the view of execution the programmer expects from the original sequential program. Our tools can take an execution trace obtained from running a program on parallel hardware and reorder it to obtain a sequential trace that matches the original program. This is especially applicable to but not limited to the coarse-grained nature of our parallelization method.

To achieve complete reconstruction, it helps if the parallelizing compiler inserts hints in the code that make it easier to match up corresponding parts of the program. In the absence of explicit hints, it may be possible to obtain full reconstruction using debug information to match parts of the program. When there are no explicit hints or debug information, partial reconstruction can be achieved by using points in the program that synchronize with each other to guide the matching process. The resulting trace will not be sequential but will be easier to understand. A useful application is to make it simpler to understand a trace of a program written using an event-based programming style (e.g., a GUI, interrupt handlers, device drivers, etc.)

Partial reconstruction could also be used to simplify parallel programs running on systems that use release consistency. Such programs must use explicit memory barriers at all synchronization points so it will be possible to simplify traces to reduce the degree of parallelism the programmer must consider.

One simple case of this is reconstructing a 'message passing' view of bus traffic.

HP has been looking at using trace to enable performance debugging of distributed protocols. Their focus is on data mining and performance not reconstructing a sequential trace. http://portal.acm.org/citation.cfm?id= 945445. 945454&dl= portal&dl=ACM& type=series&idx= 945445&part=Proceedings&WantType= Proceedings& title= ACM%20Symposium% 20on%20 Operating% 20 Systems%20Principles&CFID=11111111&CFTOKEN= 2222222

7.2 Partial Reconstruction Based on Observed Dataflow

Suppose we can identify sections of the system execution and we have a trace which lets us identify when each section was running and we have a trace of the memory accesses they performed or, from knowing properties of some of the sections, we know what memory accesses they would perform without needing a trace. The sections we can identify-might be:

function calls remote procedure calls execution of a fixed-function accelerator such as a DMA transfer message passing We can summarize the memory accesses of each section in terms of the input data and the output data (what addresses were accessed and, perhaps, what values were read or written). Given a sequence of traces of sections, we can construct a dynamic dataflow graph where each section is a node in a directed graph and there is an edge from a node M to a node N if the section corresponding to M writes to an address x and the section corresponding to N reads from address x and, in the original trace, no write to x happens between M's write to x and N's read from x.

This directed dataflow graph shows how different sections communicate with each other and can be used for a variety of purposes:

- identify potential parallelism
- identify timing-sensitive behaviour such as race conditions (when combined with a trace of synchronizations between parallel threads): if M writes to x and N reads from x and there is no chain of synchronizations from M to N to ensure that N cannot read from x before M does the read, there is a potential problem
- identify redundant memory writes (if a value is overwritten before it has been read)
- provides a simple way to show programmers what is happening in a complex, possibly parallel, system
- can be analyzed to determine the time between when data is being generated and when it is consumed. If the time is long it might suggest that memory requirements could be reduced by calculating data nearer the time or, in a parallel or concurrent system that the generating task can be executed later.
- can be analyzed to identify number and identity of consumers of data: it is often possible to manage memory more efficiently or generate data more efficiently if we know what it is being used for, when it is being used, etc.

Many other uses exist.

7.3 Full Reconstruction Based on Parallelization Transformations

The first section talks about what you need for the general case of a program that has been parallelized and you would like to serialize trace from a run of the parallel program based on some understanding of what transformations were done during parallelization (i.e., you know how different bits of the program relate to the original program). The second part talks about how you would specifically do this if the paralellization process included decoupling. The sketch describes the simplest case in which it can work but it is possible to relax these restrictions significantly.

Here is a brief description of what is required to do trace reconstruction for decoupled programs. That is, to be able to take a trace from the decoupled program and reorder it to obtain a legal trace of the original program.

Most relevant should be conditions 1-9 which say what we need from trace. Where the conditions do not hold, there need to be mechanisms to achieve the same effect or a way of relaxing the goals so that they can still be met. For example, if we can only trace activity on the bus and two kernels running on the same DE communicate by one leaving the result in DE-local memory and the other using it from there, then we either add hardware to observe accesses to local memories or we tweak the schedule to add a spurious DMA copy out of the local memory so that it appears on the bus or we pretend we didn't want to see that kind of activity anyway. Condition 10 onwards relate mainly to what decoupling aims to achieve. But, some conditions are relevant such as conditions 5 and 6 because, in practice, it is useful to be able to relax these conditions slightly. For example (5) says that kernels have exclusive access to buffers but it is obviously ok to have multiple readers of the same buffer and it would also be ok (in most real programs) for two kernels to (atomically) invoke 'malloc' and 'free' in the middle of the kernels even though the particular heap areas returned will depend on the precise interleaving of those calls and it may even be ok for debugging printfs from each kernel to be ordered.

Initial assumptions (to be relaxed later):
1. Trace can see the start and end of each kernel execution and can identify which kernel is being started or is stopping.
2. Trace can see context switches on each processor and can identify which context we are leaving and which context we are entering.

Consequences of (1)-(2): We can derive which kernel instance is running on any processor at any time.

3. Trace has a coherent, consistent view of all activity on all processors.
4. Trace can identify the source of all transactions it observes.

Two mechanisms that can make this possible are:
1. Trace might observe directly which processor caused a transaction.
or
2. Trace might observe some property of the transaction such as the destination address and combine that with some property of the kernels running at that time.

Condition 2 can be satisfied if we have each kernel only accesses buffers that are either:
1. At a static address (and of static length); or
2. At an address (and of a length) that are handed to the kernel at the start of kernel execution and trace can infer what that address and length are.

Consequences of (1)-(4): We can identify each transaction with a kernel instance and we can see all transactions a kernel performs.

5. Each kernel instance has exclusive access to each buffer during its execution.
That is, all inter-kernel communication occurs at kernel boundaries.
6. Each kernel's transactions only depend on the state of the buffers it accesses and the state of those buffers only depends on the initial state of the system and on transactions that kernels have performed since then.

Consequences of (1)-(6): Given a trace consisting of the interleaved transactions of a set of kernel instances, we can reorder the transactions such that all transactions of a kernel are contiguous and the resulting trace satisfies all read after write data dependencies. That is, we can construct a sequentially consistent view of the transactions as though kernels executed atomically and sequentially.

Note that there may be many legal traces. e.g., if A (only) writes to address 0 and then 1 and B (only) writes to address 2 and then 3 then the trace '0,2,1,3' could be reordered to '0,1,2,3' or to '2,3,0,1'.

7. Sequencing of each kernel instance is triggered by a (single) state machine. There are a number of parallel state machines. (State machines may be in dedicated hardware or a number of state machines may be simulated on a processor.)
8. State machines can synchronize with each other and can wait for completion of a kernel and state transitions can depend (only) on those synchronizations and on the results of kernels.
9. Trace has a sequentially consistent, coherent view of all state transitions of the sequencers and all synchronization.

Consequences of (7)-(9): Given a trace of the state transitions and synchronizations, we can reorder them into any of the set of legal transitions those state machines could have made where a transition is legal if it respects synchronization dependencies.

Consequences of (1)-(9): Given a trace of all kernel transactions and all state transitions and synchronizations, we can reorder them into any legal trace which respects the same synchronization dependencies and data dependencies.

The challenge of trace reconstruction is to show that, if you decouple a program, then the following holds. (Actually, this is what you want to show for almost any way you may parallelize a program.)

10. We assume that we have a single 'master' deterministic state machine that corresponds to the set of parallel, deterministic state machines in the following way:
    a. Any trace of the 'master' state machine is a legal trace of the parallel state machine.
    b. Some traces of the parallel state machine can be reordered into a legal trace of the master state machine.
    c. Those traces of the parallel state machine that cannot be reordered to give a legal trace of the master, are a prefix of a trace that can be reordered to give a legal trace of the master.
    That is, any run of the parallel machine can be run forward to a point equivalent to a run of the master state machine.

(We further assume that we know how to do this reordering and how to identify equivalent points.)

Consequences of (1)-(10): We can reorder any trace to match a sequential version of the same program.

To show that decoupling gives us property (10) (i.e., that any trace of the decoupled program can be reordered to give a trace of the original program and to show how to do that reordering), we need to establish a relationship between the parallel state machine and the master state machine (i.e., the original program). This relationship is an "embedding" (i.e., a mapping between states in the parallel and the master machines such that the transitions map to each other in the obvious way). It is probably easiest to prove this by considering what happens when we decouple a single state machine (i.e., a program) into two parallel state machines.

When we decouple, we take a connected set of states in the original and create a new state machine containing copies of those states but:

1. The two machines synchronize with each other on all transitions into and out of that set of states.
2. The two machines contain a partition of the kernel activations of the original machine.
3. The two machines each contain a subset (which may overlap) of the transitions of the original machine.

From this, it follows that the parallel machine_can_execute the same sequence as the original machine. To show that it_must_execute an equivalent sequence (i.e., that we can always reorder the trace), we need the following properties of decoupling:

4. All data dependencies are respected: if kernel B reads data written by kernel A, then both are executed in sequence on the same state machine or the state machines will synchronize after A completes and before B starts.
   Note that this depends on the fact that channels are FIFO queues so data is delivered in order.

Extensions of decoupling allow the programmer to indicate that two operations can be executed in either order even though there is a data dependency between them (e.g., both increment a variable atomically). This mostly needs us to relax the definition of what trace reconstruction is meant to do. One major requirement is that the choice of order doesn't have any knock-on effects on control flow.

5. Deadlock should not happen:
    threads cannot block indefinitely on a put as long as each queue has space for at least one value.
    threads cannot block indefinitely on a get: either one thread is still making progress towards a put or, if they both hit a get, at least one will succeed.

Outline proof: Because they share the same control flow, the two threads perform opposing actions (i.e., a put/get pair) on channels in the same sequence as each other. A thread can only block on a get or a put if it has run ahead of the other thread. Therefore, when one thread is blocked, the other is always runnable.

Extensions of decoupling allow for the following:

1. Locks are Added by the Programmer.
To avoid deadlock, we require:
    The standard condition that locks must always be obtained in a consistent order.
    If the leading thread blocks on a channel while holding a lock, then the trailing thread cannot block on the same lock.
A sufficient (and almost necessary) condition is that a put and a get on the same channel must not be inside corresponding critical sections (in different threads):

```
// Not allowed
parallel_sections{
    section{ ... lock(1); ... put(ch,x); ... unlock(1); ...}
    section{ ... lock(1); ... get(ch,x); ... unlock(1); ...}
}
``` which means that the original code cannot have looked like this:
    ... lock(1); ... DECOUPLE(ch,x); ... unlock(1); ...
That is, extreme care must be taken if DECOUPLE occurs inside a critical section especially when inserting DECOUPLE annotations automatically 2. Puts and Gets Don't have to Occur in Pairs in the Program.

A useful and safe special case is that all initialization code does N puts, a loop then contains only put-get pairs and then finalization code does at most N gets. It should be possible to prove that this special case is ok.

It might also be possible to prove the following for programs containing arbitrary puts and gets: if the original single-threaded program does not deadlock (i.e., never does a get on an empty channel or a put on a full channel), then neither will the decoupled program.

8 Exploiting Schedule Flexibility 8.1 Overview

A long-standing problem of parallelizing compilers is that it is virtually impossible to provide the programmer with a start-stop debugger that lets them debug in terms of their sequential program even though it runs in parallel. In particular, we would like to be able to run the program quickly (on the parallel hardware) for a few minutes and then switch to a sequential view when we want to debug.

It is not necessary (and hard) to seamlessly switch from running parallel code to running sequential code but it is feasible to change the scheduling rules to force the program to run only one task at a time. With compiler help, it is possible to execute in almost the sequence that the original program would have executed. With less compiler help or where the original program was parallel, it is possible to present a simpler schedule than on the original program. This method can be applied to interrupt driven program too.

This same method of tweaking the scheduler while leaving the application unchanged can be used to test programs more thoroughly. Some useful examples:
    Testing the robustness of a real time system by modifying the runtime of tasks. Making a task longer may cause a deadline to be missed. Making a task longer may detect scheduling anomalies where the system runs faster if one part becomes slower. (Scheduling anomalies usually indicate that priorities have been set incorrectly.) Making tasks take randomly longer times establishes how stable a schedule is.

Providing better test coverage in parallel systems. Race conditions and deadlock often have a small window of opportunity which it is hard to detect in testing because the 'windows' of several threads have to be aligned for the problem to manifest. By delaying threads by different amounts, we can cause different parts of each thread to overlap so that we can test a variety of alignments. (We can also measure which alignments we have tested so far for test-coverage statistics and for guided search.) This is especially useful for interrupt-driven code.

John Regehr did some work on avoiding interrupt overload by delaying and combining interrupts. http://portal.acm.org/citation.cfm?id=945445.945454&dl=portal&dl=ACM&type=series&idx=945445&part=Proceedings&WantType=Proceedings&title=ACM%20Symposium%20on%20Operating%20Systems%20Principles&CFID=11111111&CFTOKEN=2222222 but this is really about modifying the (hardware) scheduling of interrupts to have more desirable properties for building real time systems whereas we are more interested in:

debugging, tracing and testing systems (and some of the stuff we do might actually break real-time properties of the system)

thread schedulers (but we still want to do some interrupt tweaking)

8.2 Testing Concurrent Systems

Errors in concurrent systems often stem from timing-dependent behaviour. It is hard to find and to reproduce errors because they depend on two independently executing sections of code executing at the same time (on a single-processor system, this means that one section is pre-empted and the other section runs). The problematic sections are often not identified in the code.

Concurrent systems often have a lot of flexibility about when a particular piece of code should run: a task may have a deadline or it may require that it receive 2 seconds of CPU in every 10 second interval but tasks rarely require that they receive a particular pattern of scheduling.

The idea is to use the flexibility that the system provides to explore different sequences from those that a traditional scheduler would provide. In particular, we can use the same scheduler but modify task properties (such as deadlines or priorities) so that the system should still satisfy real time requirements or, more flexibly, use a different scheduler which uses a different schedule.

Most schedulers in common use are 'work conserving schedulers': if the resources needed to run a task are available and the task is due to execute, the task is started. In contrast, a non-work-conserving scheduler might choose to leave a resource idle for a short time even though it could be used. Non-work-conserving schedulers are normally used to improve efficiency where there is a possibility that a better choice of task will become available if the scheduler delays for a short time.

A non-work-conserving scheduler for testing concurrent systems because they provide more flexibility over the precise timing of different tasks than does a work-conserving scheduler.

In particular, we can exploit flexibility in the following way:

model the effect of possibly increased runtime of different tasks. e.g., if task A takes 100 microseconds and we want to know what would happen if it took 150 microseconds, the scheduler can delay scheduling any tasks for 50 microseconds after A completes. A special case is uniformly slowing down all tasks to establish the 'critical scaling factor'. Another interesting thing to watch for is 'scheduling anomalies' where a small change in the runtime of a task can have a large effect on the overall schedule and, in particular, where increasing the runtime of one task can cause another task to execute earlier (which can have both good and bad effects).

model the effect of variability in the runtime of different tasks by waiting a random amount of time after each task completes cause two tasks to execute at a range of different phases relative to each other by delaying the start of execution of one or the other of the tasks by different amounts. Where the tasks are not periodic, (e.g., they are triggered by external events) you might delay execution of one task until some time after the other task has been triggered.

In all these cases, the modification of the schedule is probably done within the constraints of the real-time requirements of the tasks. For example, when a task becomes runnable, one might establish how much 'slack' there is in the schedule and then choose to delay the task for at most that amount. In particular, when exploring different phases, if the second event doesn't happen within that period of slack, then the first event must be sent to the system and we will hope to explore that phase the next time the event triggers.

It is often useful to monitor which different schedules have been explored either to report to the programmer exactly what tests have been performed and which ones found problems or to drive a feedback loop where a test harness keeps testing different schedules until sufficient test coverage has been achieved.

8.3 Debugging Parallel Systems

When a sequential program is parallelized, it is often the case that one of the possible schedules that the scheduler might choose causes the program to execute in exactly the same order that the original program would have executed. (Where this is not true, such as with a non-preemptive scheduler it is sometimes possible to insert pre-emption points into the code to make it true.)

If the scheduler is able to determine what is currently executing and what would have run next in the original program, the scheduler can choose to execute the thread that would run that piece of code. (Again, it may be necessary to insert instrumentation into the code to help the scheduler figure out the status of each thread so that it can execute them in the correct order.)

8.4 Tracing Parallel Systems

Reduce amount of reordering required by reordering the execution which might reduce size of window required, simplify task of separating out parallel streams of memory accesses, eliminate the need to reorder trace at all, etc.

9. Exploiting High Level View 9.1 Overview

Working with the whole program at once and following compilation through many different levels of abstraction allows us to exploit information from one level of compilation in a higher or lower level. Some examples:

Executing with very abstract models of kernels can give us faster simulation which gives visualization, compiler feedback and regression checks on meeting deadlines.

We can plug a high level simulator of one component into a low level system simulation (using back-annotation of timing) and vice-versa.

We can simulate at various levels of detail: trace start/stop events (but don't simulate kernels), functional simulation using semihosting, bus traffic simulation, etc.

We can use our knowledge of the high level semantics to insert checking to confirm that the high-level semantics is enforced. For example, if a kernel is supposed to access only some address ranges, we can use an MPU to enforce that.

We can reconstruct a 'message-passing view' of bus traffic.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer implemented method of transforming a source computer program to form a transformed computer program for distributed execution upon a plurality of execution mechanisms of an asymmetric multiprocessing apparatus having an asymmetric memory hierarchy including a plurality of memories, said method comprising the steps of:
    receiving as an input variable an at least partial architectural description of said asymmetric multiprocessor apparatus including data identifying:
    (i) said plurality of execution mechanisms;
    (ii) said plurality of memories; and
    (iii) a communication path topology indicating which of said plurality of memories are accessible by which of said execution mechanisms; and
    in dependence upon said at least partial architectural description, adding mapping support to said source computer program to adapt said source computer program for execution upon said asymmetric multiprocessing apparatus as part of forming said transformed computer program, wherein said mapping support includes an exact execution mechanism specifier specifying one of said plurality of execution mechanisms to be used to execute a portion of said transformed computer program associated with said exact execution mechanism specifier.

2. A method as claimed in claim 1, wherein said mapping support includes a cache flush command to invoke a cache flush to a higher order memory from a cache memory associated with one of said execution mechanisms.

3. A method as claimed in claim 2, wherein said cache flush command is added at a point within said transformed computer program that updates data held within said higher order memory prior to access to said data within said higher order memory by another execution mechanism.

4. A method as claimed in claim 1, wherein said mapping support includes a cache invalidate command to invoke a cache invalidation operation for a cache memory associated with one of said execution mechanisms, said cache storing data held within a higher order memory.

5. A method as claimed in claim 4, wherein said cache invalidation command is added at a point within said transformed computer program corresponding to updating of data held within said higher order memory by another execution mechanism.

6. A method as claimed in claim 1, wherein said asymmetric multiprocessing apparatus includes a DMA unit and said mapping support includes a DMA command to invoke a data transfer operation between a source memory and a destination memory within said asymmetric memory hierarchy to be performed by said DMA unit.

7. A method as claimed in claim 6, wherein said DMA command is added at a point within said transformed computer program corresponding to a requirement to provide access to data held within said source memory to an execution mechanism having access to said destination memory and not having access to said source memory.

8. A method as claimed in claim 1, wherein said mapping support includes an interaction command to invoke an interaction between different execution mechanisms of said asymmetric multiprocessing apparatus.

9. A method as claimed in claim 1, wherein said mapping support does not fully specify how said source computer program should be executed by said asymmetric multiprocessing apparatus and further comprising inferring a full mapping between said source computer program and said asymmetric multiprocessing apparatus when transforming said transformed computer program including said mapping support into an executable computer program.

10. A method as claimed in claim 1, wherein said mapping support includes an abstract execution mechanism specifier specifying a group of said plurality of execution mechanisms associated with a portion of said transformed computer program, an execution mechanism to be used to execute said portion of said transformed computer program being selected from said group.

11. A method as claimed in claim 1, wherein said mapping support includes an exact memory specifier specifying which of said plurality of memories is to be used to store an associated data item to be processed under control of said transformed computer program.

12. A method as claimed in claim 1, wherein said mapping support includes an abstract memory specifier specifying a group of said plurality of memories associated with a data item to be processed by said transformed computer program, an memory to be used to store said data item being selected from said group.

13. A method as claimed in claim 1, wherein said at least partial architectural description specifies respective processing capabilities of said execution mechanisms.

14. A method as claimed in claim 13, wherein said step of adding is dependent upon respective processing capabilities of said execution mechanisms.

15. A method as claimed in claim 11, wherein at said least one said exact memory specifier indicates that said data item should be stored in a specified region of a memory.

16. A method as claimed in claim 11, wherein at said least one said exact memory specifier indicates that said data item should be double buffered.

17. A method as claimed in claim 1, wherein said at least partial architectural description is one of:
    a IP-XACT description; and
    a SoC designer model.

18. A method as claimed in claim 1, wherein said plurality of execution mechanisms include one or more of:
    a general purpose processor;
    a direct memory access unit;
    a coprocessor;
    an VLIW processor;
    a digital signal processor; and
    a hardware accelerator unit.

19. A method as claimed in claim 1, wherein said asymmetric memory hierarchy comprises one or more of:
    a global shared memory accessible to all of said execution mechanisms;
    a shared memory accessible to at least two of said execution mechanisms; and a private memory accessible to one of said execution mechanisms.

20. A computer program product comprising a non-transitory computer readable storage medium storing a computer program for controlling a computer to perform the method of claim 1.

21. A computer executing a computer program to perform the method of claim 1.

* * * * *